United States Patent [19]

Kawabata

[11] Patent Number: 5,042,833
[45] Date of Patent: Aug. 27, 1991

[54] ACTIVE SUSPENSION SYSTEM WITH FAIL-SAFE SYSTEM CAPABLE OF AUTOMATICALLY RESUMING NORMAL SUSPENSION CONTROL UPON RESUMPTION OF NORMAL STATE OPERATION

[75] Inventor: Kazunobu Kawabata, Yokohama, Japan

[73] Assignee: Nissan Motor Company, Limited, Japan

[21] Appl. No.: 574,687

[22] Filed: Aug. 30, 1990

[30] Foreign Application Priority Data

Aug. 31, 1989 [JP] Japan .................................. 1-225573

[51] Int. Cl.⁵ ............................................ B60G 11/26
[52] U.S. Cl. .............................. 280/707; 364/424.05
[58] Field of Search .................. 280/707, 714, DIG. 1; 364/424.05

[56] References Cited

U.S. PATENT DOCUMENTS

| 4,821,191 | 4/1989 | Ikemoto et al. | 280/707 |
| 4,827,416 | 5/1989 | Kawagoe | 364/424.05 |
| 4,830,397 | 5/1989 | Watanabe et al. | 280/707 |
| 4,852,906 | 8/1989 | Buma et al. | 280/707 |

FOREIGN PATENT DOCUMENTS

| 0249209 | 6/1987 | European Pat. Off. . |
| 0249227 | 6/1987 | European Pat. Off. . |
| 0285153 | 3/1988 | European Pat. Off. . |
| 0286072 | 4/1988 | European Pat. Off. . |
| 1-145215 | 6/1989 | Japan . |

Primary Examiner—Kenneth R. Rice
Attorney, Agent, or Firm—Lowe, Price, LeBlanc & Becker

[57] ABSTRACT

An active suspension system is provided with a fail detector for detecting failure of control system which includes sensors, control unit, control valves and so forth. Fail-safe operation is taken place by closing a fluid circuit across a working chamber in a suspension system disposed between a vehicular body and a road wheel and a pressure control valve for adjusting the fluid pressure in the working chamber, and by adjusting the fluid pressure in the closed circuit substantially at a predetermined neutral pressure. The system further includes a vehicular driving condition monitor for monitoring vehicular driving condition. When faulty condition of the control system is cured or terminated, active suspension control is resumed at a timing when the vehicular driving condition monitor detects a predetermined vehicular driving condition stable enough for permitting resumption of active suspension control.

16 Claims, 7 Drawing Sheets

ACTIVE SUSPENSION SYSTEM WITH FAIL-SAFE SYSTEM CAPABLE OF AUTOMATICALLY RESUMING NORMAL SUSPENSION CONTROL UPON RESUMPTION OF NORMAL STATE OPERATION

BACKGROUND OF THE INVENTION

1. Field of the Invention

The present invention relates generally to an active suspension system for an automotive vehicle. More specifically, the invention relates to an active suspension system which can perform fail-safe operation upon detection of failure of the active suspension system and can automatically resume normal state of suspension control when operation of the active suspension system resumes into normal state and a predetermined vehicular driving condition is satisfied.

2. Description of the Background Art

Japanese Patent First (unexamined) Publication (Tokkai) Heisei 1-145215 discloses an active suspension system with a fail-safe system. In the disclosure, the system has hydraulic cylinders at respective suspension systems disposed between a vehicular body and road wheels. Respective of the hydraulic cylinders have working chambers externally connected to a fluid pressure source to receive therefrom a line pressure. Pressure control valves are provided in a hydraulic circuit so that the fluid pressure in each of the working chambers of the hydraulic cylinders can be controlled independently of each other. The hydraulic circuit further includes an operational check valve disposed in a drain line and an one-way check valve in a supply line for preventing surge flow. The operational check valve and the one-way check valve forms pressure holding mechanism for maintaining line pressure in the vicinity of a predetermined neutral pressure which is set at a pressure level sufficient for maintaining a vehicular height at a neutral or target height level at a predetermined standard vehicular load of passengers and luggage. For enabling this, the operational check valve is designed to be operated between flow permitting position while the line pressure supplied to the pressure control valve is maintained higher than a predetermined pressure, e.g. in the vicinity of the neutral pressure, and flow blocking position while the line pressure to be supplied to the pressure control valve is held below the set pressure. The system is further provided with a fail-safe valve disposed in the hydraulic circuit. The fail-safe valve normally permits fluid flow through the supply line and the drain line for supplying line pressure for the pressure control valve and for draining pressurized fluid from the pressure control valve to a fluid pressure source through the drain line. The fail-safe valve is operated into a fail-safe mode position in response to detection of failure of active suspension system for blocking fluid flow both through the supply line and the drain line in order to establish a closed circuit across the pressure control valve and the working chambers for temporarily holding the fluid pressure in the working chambers at an instantaneous fluid pressure level and subsequently adjusting the fluid pressure in the working chambers toward the neutral pressure.

In such prior proposed system, although such prior proposed system is successful to back-up failure of the active suspension system by permitting vehicular travel by placing the system at fail-safe mode, in which the suspension systems operates as usual passive suspension, the normal mode of suspension control is resumed in response to termination of the abnormal state of the active suspension system. For example, assuming the failure is caused by malfunction in software in a control unit which can be cured by resetting the control unit, normal state of suspension control can be resumed after temporary fail-safe operation. This manner of resumption of the normal state of suspension control can degrade vehicular driveability at certain vehicle driving condition. Namely, when fail-safe mode operation is initiated, the fluid pressure is maintained at neutral pressure. At this condition, the hydraulic cylinder operates in a manner equivalent to the ordinary passive damper, i.e. normal shock absorber, for generating damping force only by effect of flow restrictive orifices. Therefore, vehicular attitude change can be caused according to magnitude of longitudinal or lateral acceleration exerted on the vehicular body. When resumption of normal active suspension control is taken place at the vehicular condition in which the vehicle is caused pitching or rolling, anti-pitching or anti-rolling action is instantly taken place to start adjustment of the fluid pressure for regulating the vehicular attitude. As a result, sudden change of the fluid pressure in the working chamber can be caused for causing shifting of gravity center. Since the pitching and rolling on the vehicular body is caused at relatively unstable condition of the vehicle, such sudden shifting of the gravity center requires additional control of vehicular behavior. This should not be pleasant or comfortable for the driver.

SUMMARY OF THE INVENTION

Therefore, it is an object of the present invention to provide an active suspension system which can solve the drawback in the prior art.

Another and more specific object of the present invention is to provide an active suspension system which can discriminate vehicular driving condition and resumes normal active suspension control after termination of abnormal state of system at a vehicular condition where resumption of normal active suspension control may not affect vehicular driving stability.

In order to accomplish aforementioned and other objects, an active suspension system, according to the present invention, provided a fail detector for detecting failure of control system which includes sensors, control unit, control valves and so forth. Fail-safe operation is taken place by closing a fluid circuit across a working chamber in a suspension system disposed between a vehicular body and a road wheel and a pressure control valve for adjusting the fluid pressure in the working chamber, and by adjusting the fluid pressure in the closed circuit substantially at a predetermined neutral pressure. The system further includes a vehicular driving condition monitor for monitoring vehicular driving condition. When faulty condition of the control system is cured or terminated, active suspension control is resumed at a timing when the vehicular driving condition monitor detects a predetermined vehicular driving condition stable enough for permitting resumption of active suspension control.

According to one aspect of the invention, an active suspension system comprises:

a suspension system disposed between a vehicular body and a road wheel for damping energy for causing relative displacement between the vehicular body and the road wheel, said suspension system including means for defining a variable pressure chamber;

a fluid circuit for circulating pressurized fluid across said variable pressure chamber, said fluid circuit including a pressurized fluid source and a pressure control valve means for adjusting fluid pressure within said variable pressure chamber across a predetermined neutral pressure;

a sensor means for monitoring vehicular driving parameter affecting vehicular attitude for producing a sensor signal indicative thereof;

a power supply circuit for supplying an electric power to said fluid pressure source for driving the latter;

a detector means for monitoring state of fluid flow for detecting line pressure to be supplied to said pressure control valve higher than said neutral pressure to produce a detector signal indicative thereof;

a fail-safe valve means disposed in said fluid circuit for establishing closed circuit across said pressure control valve and said working chamber for maintaining fluid pressure in said closed circuit substantially at said neutral pressure, in response to a fail-safe command;

a fail detector means for detecting of failure of component of suspension control system to produce a fail detecting signal which is to be maintained while the faulty condition of the component of said suspension control system is maintained;

a vehicular driving condition detector for detecting a predetermined vehicle driving condition for producing a vehicular driving condition indicative signal; and a control means responsive to said sensor signal for deriving a suspension control command for controlling said pressure control valve for adjusting pressure in said variable pressure chamber for regulating vehicular height and vehicular attitude, said control unit being responsive to said fail detecting signal to produce said fail-safe command and responsive termination of said fail detecting signal for resuming normal active suspension control when and condition of absence of said fail detecting signal and presence of said vehicular driving condition indicative signal is established.

The active suspension system may further comprise a pressure holding valve disposed in said drain line of said fluid circuit, which pressure holding valve is responsive to a line pressure lower than said neutral pressure for blocking fluid flow through said drain line, and said fail-safe valve means including a flow restriction orifice disposed in said drain line upstream of said pressure holding valve for permitting limited flow rate of working fluid while said fail-safe valve is in active position in response to said fail-safe command for permitting adjustment of fluid pressure toward the neutral pressure.

The vehicle driving condition detector detects the vehicular driving condition, in which vehicle is not running or is traveling in straight which may not cause vehicular attitude change, vehicle is not running and the power supply circuit is switched from power shut down position to power supply position, vehicle is not running and brake is applied or vehicle is not running and all vehicular doors are closed.

The active suspension system may further comprise a flow control valve network disposed between said pressurized fluid source and said pressure control valve means in said fluid circuit for establishing and blocking fluid communication between said pressurized fluid source and said pressure control valve means, said flow control valve network further operating to blocking of fluid flow back to said pressurized fluid source from said pressure control valve when the line pressure supplied to said pressure control valve is lower than said neutral pressure, and said control means is powered by the electric power supplied by said power supply circuit, said control means being responsive to initiation of power supply for maintaining said flow control valve network at flow blocking position until the line pressure at said pressure control valve is increased across said neutral pressure and maintaining said suspension control command value at a predetermined value for a predetermined period after placing said flow control valve network at a state permitting fluid flow thereacross. The control means may maintain said flow control valve network at said flow blocking position for a predetermined period after turning of power supply circuit from power shut down position to power supply position. The control means may also be designed to maintain operation until the line pressure at said pressure control valve is adjusted substantially at said neutral pressure after shutting down of power supply from said power supply circuit. The control means may set said predetermined value to be initially set as said suspension control command value at a value substantially corresponding to said neutral pressure.

According to another aspect of the invention, an active suspension system comprises:

a suspension system disposed between a vehicular body and a road wheel for damping energy for causing relative displacement between the vehicular body and the road wheel, said suspension system including means for defining a variable pressure chamber;

a fluid circuit, including a supply line for supplying pressurized fluid and a drain line for driving pressurized fluid, for circulating pressurized fluid through said supply line and said drain line across said variable pressure chamber, said fluid circuit including a pressurized fluid source and a pressure control valve means for adjusting fluid pressure within said variable pressure chamber across a predetermined neutral pressure;

a first flow control means disposed in said drain line between said pressure control valve and said pressurized fluid source, said second flow control means being responsive to the magnitude of line pressure supplied to said pressure control valve for switching position between a third flow control mode for permitting fluid flow thereacross for flowing back the working fluid drained from said pressure control valve to said pressurized fluid source while said line pressure supplied to said pressure control valve is maintained at least said neutral pressure, and a fourth flow control mode for blocking fluid flow therethrough while said line pressure supplied to said pressure control valve is maintained below said neutral pressure;

a sensor means for monitoring vehicular driving parameter affecting vehicular attitude for producing a sensor signal indicative thereof;

a control means responsive to said sensor signal for deriving a suspension control command for controlling said pressure control valve for adjusting pressure in said variable pressure chamber for regulating vehicular height and vehicular attitude, a fail-safe valve means disposed in said fluid circuit for establishing closed circuit across said pressure control valve and said working chamber for maintaining fluid pressure in said closed circuit substantially at said neutral pressure, in response to a fail-safe command;

a fail detector means for detecting of failure of component of suspension control system to produce a fail detecting signal which is to be maintained while the faulty condition of the component of said suspension control system is maintained;

a vehicular driving condition detector for detecting a predetermined stable vehicle driving condition for producing a stable vehicular driving condition indicative signal; and a control means responsive to said sensor signal for deriving a suspension control command for controlling said pressure control valve for adjusting pressure in said variable pressure chamber for regulating vehicular height and vehicular attitude, said control unit being responsive to said fail detecting signal to produce said fail-safe command and responsive termination of said fail detecting signal for resuming normal active suspension control when and condition of absence of said fail detecting signal and presence of said stable vehicular driving condition indicative signal is established.

The active suspension system may further comprise a power supply circuit for supplying an electric power to said fluid pressure source for driving the latter so as to enable supply of pressurized fluid to said fluid circuit, and a second flow control means disposed in said supply line between said pressurized fluid source and said pressure control valve means in said fluid circuit, said flow control means being operable between a first flow control mode for supplying line pressure for said pressure control valve at a first maximum flow rate and a second flow control mode for supplying line pressure for said pressure control valve at a second limited flow rate which is smaller than said first maximum flow rate, and said control unit is powered by the electric power supplied by said power supply circuit, said control means being responsive to initiation of power supply for maintaining said flow control means at said second flow control mode until said detector signal is present and maintaining said suspension control command value at a predetermined value for a predetermined period after placing said flow control valve network at a state permitting fluid flow thereacross.

BRIEF DESCRIPTION OF THE DRAWINGS

The present invention will be understood more fully from the detailed description given herebelow and from the accompanying drawings of the preferred embodiment of the invention, which, however, should not be taken to limit the invention to the specific embodiment but are for explanation and understanding only.

In the drawings.

DESCRIPTION OF THE PREFERRED EMBODIMENT

Figure 1:
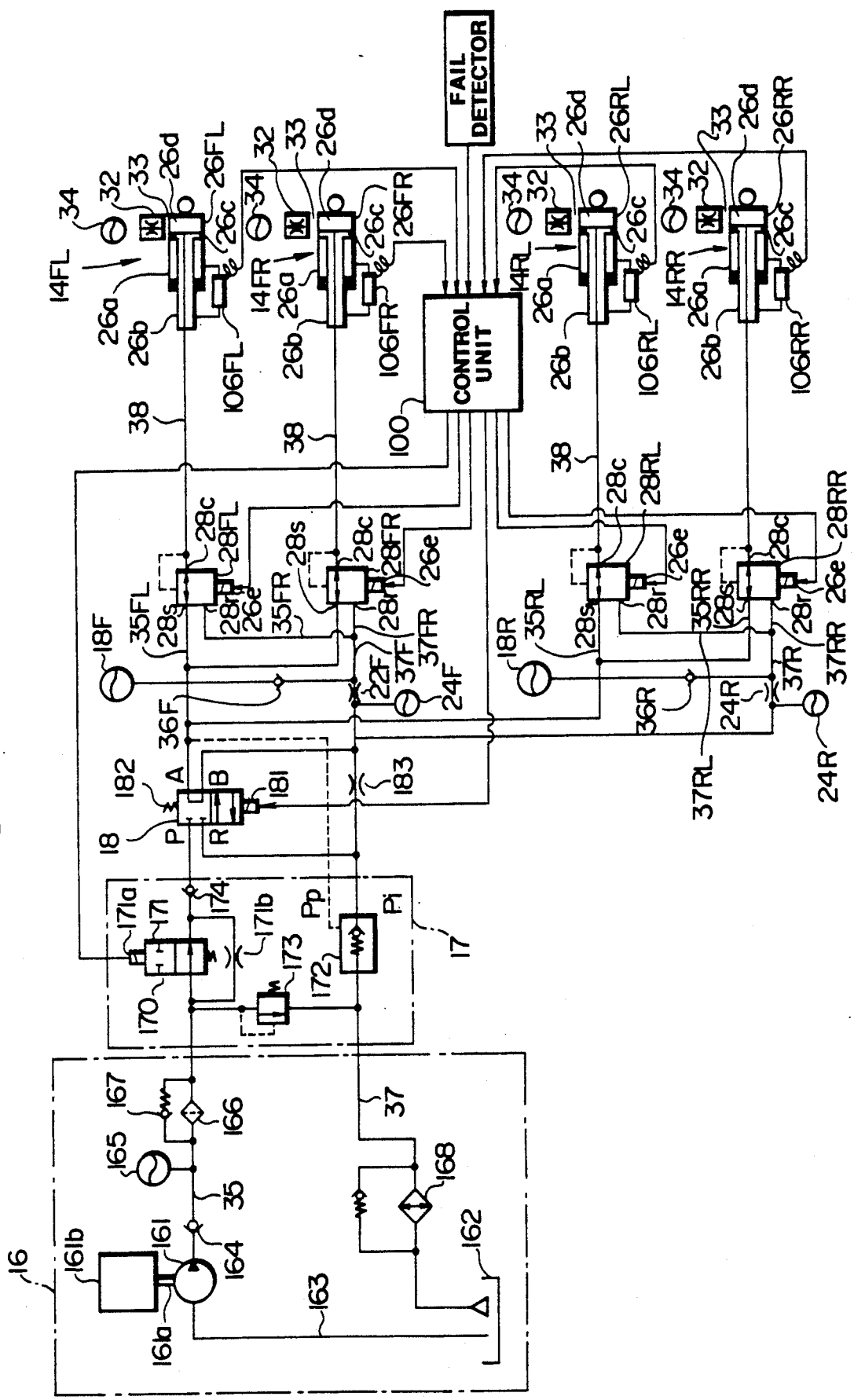
FIG. 1 is a diagrammatic illustration of the preferred embodiment of an active suspension control system, according to the present invention.

Referring now to the drawings, particularly to FIG. 1, the preferred embodiment of an active suspension system, according to the present invention, is designed to generally perform suspension control for regulating vehicular height level and vehicular attitude by suppressing relative displacement between a vehicular body and suspension members provided in front-left, front-right, rear-left and rear-right suspension mechanism 14FL, 14FR, 14RL and 14RR and rotatably supporting front-left, front-right, rear-left and rear-right wheels. The suspension mechanism as generally referred to will be hereafter represented by the reference numeral "14". Respective front-left, front-right, rear-left and rear-right suspension mechanisms 14FL, 14FR, 14RL and 14RR have hydraulic cylinders 26FL, 26FR, 26RL and 26RR which will be represented by the reference numeral "26" as generally referred to.

Each of the hydraulic cylinder 26 is disposed between the vehicular body and the suspension member to produce a damping force for suppressing relative displacement between the vehicular body and the suspension member. The hydraulic cylinder 26 generally comprises an essentially enclosed cylindrical cylinder body $26a$ defining therein an enclosed chamber. A thrusting piston $26c$ is thrustingly and slidably disposed within the enclosed chamber of the hydraulic cylinder 26 for defining in the latter a working chamber $26d$. The piston $26c$ is connected to the associated one of suspension member 24 via a piston rod $26b$. A suspension coil spring may also be provided in respective of suspension mechanisms. However, in contrast to the normal or ordinary suspension systems, the suspension coil spring to be employed in the shown type of the suspension system is not required a resilient force in a magnitude required in the ordinary suspension system and only required the resilient force necessary for maintaining the vehicular body about the suspension member.

The working chamber $26d$ of the hydraulic cylinder 26 is connected one of pressure control valves 28FL, 28FR, 28RL and 28RR via a pressure control line 38. The pressure control valve 28FL, 28FR, 28RL and 28RR will be hereafter represented by the reference numeral "28" as generally referred to. The pressure control valve 28 has a control port $28c$ communicated with the working chamber $26d$ via the pressure control line 38. The pressure control valve 28 also has an inlet port $28s$ and a drain port $28r$. The inlet port $28s$ of the pressure control valve 28 is connected to o a pressure source unit 16 via a supply line 35, and the drain port $28r$ thereof is communicated with a drain line 37. The pressure control valve 28 incorporates a proportioning solenoid $26e$ for adjusting valve position according to magnitude of suspension control signal $I_{FL}$, $I_{FR}$, $I_{RL}$ and $I_{RR}$ supplied from the control unit 100. The suspension control signal $I_{FL}$, $I_{FR}$, $I_{RL}$ and $[E]I[-]RR$ are current signal having a variable current value representative of commanding pressure in the working chamber. A branch circuit is provided for connecting the working chamber 38 to a pressure accumulator 34 via a flow path 33 and a flow restricting means, such as an orifice 32. This pressure accumulator 34 may be hereafter referred to as "low pressure accumulator". Another pressure accumulators 20F and 20R are provided in the supply line 35 for accumulating the excessive pressure generated in the pressure source unit 16.

The pressure control valves 2 comprise, though it is not clearly shown in FIG. 1, electrically or electromagnetically operable actuators, such as a proportioning solenoids. The hydraulic cylinder 26 and the pressure control valve 28 may be of any suitable constructions for adjusting damping characteristics with sufficiently high response. Typical constructions of the hydraulic cylinder 26 and the pressure control valve 28 have been disclosed in the following prior applications or publications:

U.S. patent application Ser. No. 052,934, filed on May 22, 1989;

U.S. patent application Ser. No. 059,888, filed on June 9, 1987, corresponding European Patent Application has been published as First Publication No. 02 49 209;

U.S. patent application Ser. No. 060,856, filed on June 12, 1987, corresponding European Patent Application has been published as First Publication No. 02 49 227;

U.S. patent application Ser. No. 060,909, filed on June 12, 1987;

U.S. patent application Ser. No. 060,911, filed on June 12, 1987;

U.S. patent application Ser. No. 176,246, filed on Mar. 31, 1988, the corresponding European Patent Application has been published as First Publication No. 02 85 153;

U.S. patent application Ser. No. 178,066, filed on Apr. 5, 1988, the corresponding European Patent Application has been published as First Publication No. 02 86 072;

U.S. patent application Ser. No. 167,835, filed on Mar. 4, 1988;

U.S. patent application Ser. No. 244,008, filed on Sept. 14, 1988;

U.S. patent application Ser. No. 255,560, filed on Oct. 11, 1988;

U.S. patent application Ser. No. 266,763, filed on Nov. 3, 1988;

U.S. patent application Ser. No. 261,870, filed on Oct. 25, 1988;

U.S. patent application Ser. No. 263,764, filed on Oct. 28, 1988;

U.S. patent application Ser. No. 277,376, filed on Nov. 29, 1988;

U.S. patent application Ser. No. 303,338, filed on Jan. 26, 1989;

U.S. patent application Ser. No. 310,130, filed on Mar. 22, 1989;

U.S. patent application Ser. No. 327,460, filed on Mar. 22, 1989;

U.S. patent application Ser. No. 303,339, filed on Jan. 26, 1989;

U.S. patent application Ser. No. 331,602, filed on Mar. 31, 1989;

U.S. patent application Ser. No. 331,653, filed Mar. 31, 1989;

U.S. patent application Ser. No. 364,477, filed on June 12, 1989;

U.S. patent application Ser. No. 365,468, filed on June 12, 1989;

The disclosures of the above-identified copending U.S. Patent Applications and corresponding publications are herein incorporated by reference for the sake of disclosure.

The pressure source unit 16 includes a fluid pump 161 which is drivingly associated with the output shaft 161a of an automotive engine 161b to be driven by the driving torque of the engine. The fluid pump 161 is connected to a fluid reservoir 162 via a suction line 163 to suck a working fluid stored in the fluid reservoir 162. The pressure source unit 16 also includes a surge valve 164 for preventing surge flow of the pressurized fluid, a pressure regulating accumulator 165, a fluid filter 166 and a by-pass path with an one-way check valve 167.

The shown circuit includes a pressure holding section 17 which includes a fluid flow rate adjusting stage 170. The flow rate adjusting stage 170 includes a flow control valve 171. The pressure holding section 17 also includes a pilot operated operational check valve 172, a pressure relief valve 173. The pressure relief valve 173 is set a predetermined set pressure for determining a maximum level of line pressure in the supply line 35. The operational check valve 172 is connected to the supply line in a pilot port for introducing therefrom the line pressure as a pilot pressure $P_P$. In general, the operational check valve 172 is responsive to the pilot pressure $P_P$ higher than the aforementioned neutral pressure $P_N$ to permit the working fluid in the drain line 37 to flow returning to the fluid reservoir 162 via a fluid filter 168. On the other hand, when the pilot pressure $P_P$ introduced from the supply line 35 is lower than the neutral pressure $P_N$, the operational check valve 172 is maintained in flow blocking position for blocking fluid flow through the drain line 37.

The flow control valve 171 incorporates an electromagnetic actuator 171a connected to the control unit 100 and is designed to be controlled the valve position by a flow control signal $CS_2$ supplied from the control unit. In brief, the flow control valve 171 is designed to be placed at flow blocking position for a given period after turning of an ignition switch (not shown) from OFF to ON. While the flow control valve 171 is maintained in flow blocking position, the pressurized fluid is supplied only through a flow restriction orifice 171b. Therefore, at this valve position, limited flow rate of the working fluid flows through the supply line 35.

A fail-safe valve 18 is provided downstream of the flow rate adjusting section 17. The fail-safe valve 18 comprises a spring off-set type four port, two position valve which has a P port connected to an one-way check valve 174 in the flow rate adjusting section 17. The fail-safe valve 18 also has A port connected to the inlet ports 28s of respective pressure control valves 28, B port connected to the drain ports 28r of the pressure control valves 28, and B port connected to inlet port of the operational check valve 172. The fail-safe valve 18 incorporates an electromagnetic actuator 181 connected to the control unit to be controlled the valve position by a fail-safe signal $CS_1$.

While the fail-safe signal $CS_1$ is maintained HIGH level to maintain the actuator 181 at energized state the fail-safe valve 18 establishes fluid communication between the P port and A port for supplying the line pressure to the pressure control valves 28. At the same time, the B port and R port are also communicated to permit fluid in the drain line 37 to flow therethrough. On the other hand, when the fail-safe signal $CS_1$ is maintained LOW level to maintain the actuator 181 deenergized position, the fail-safe valve 18 is placed at the flow blocking position by a force of a return spring 182. At this position, the fluid flow through the supply line 35 is thus blocked. Also, since the R port is disconnected from the B port, the fluid in the drain line 37 is permitted only through a flow restriction orifice 183.

At the position between the pressure control valve 28 and the fail-safe valve 18, the supply line 35 is branched into front-left, front-right, rear-left and rear-right branches 35FL, 35FR, 35RL and 35RR respectively connected to the inlet ports 28s of the front-left, front-right, rear-left and rear-right pressure control valves 28FL, 28FR, 28RL and 28RR. Similarly, the drain line 37 is branched into front-left, front-right, rear-left and rear-right branches 37FL, 37FR, 37RL and 37RR respectively connected to the drain ports 28r of the front-left, front-right, rear-left and rear-right pressure control valves 28FL, 28FR, 28RL and 28RR. The pressure accumulator 20F is connected to the upstream of a junction of the front-left and front-right branches 35FL and 35FR. Also, the pressure accumulator 20R is connected to the upstream of a junction of the rear-left and rear-right pressure control valves 35RL and 35RR. On the other hand, at a downstream of the junction between the front-left and front-right branches 37FL and 37FR of the drain line 37 is connected to the pressure accumulator 18F via an one-way check valve 36F. Similarly, at a downstream of the junction between the rear-left and rear-right branches 37RL and 37RR of the drain line 37 is connected to the pressure accumulator 18R via an one-way check valve 36R. Between the junctions where the branched drain lines 37F and 37R are connected to the pressure accumulators 18F and 18R and the B port of the fail-safe valve 18, flow restriction orifices 22F and 22R and pressure accumulators 24F and 24R are provided for absorbing back pressure in the drain line.

The actuators of the pressure control valves 28, the flow control valve 171 and the fail-safe valve 18 are connected to a microprocessor based control unit 100. The control unit 100 is connected to a lateral acceleration sensor 102, a longitudinal acceleration sensor 104, height sensors 106FL, 106FR, 106RL and 106RR. As is well known, the lateral acceleration sensor 102 monitors a lateral acceleration exerted on the vehicular body to produce a lateral acceleration indicative signal $g_y$. Similarly, the longitudinal acceleration sensor 104 monitors a longitudinal acceleration exerted on the vehicle body to produce a longitudinal acceleration indicative signal $g_x$. The height sensors 106FL, 106FR, 106RL and 106RR are provided at respective positions where front-left, front-right, rear-left and rear-right suspension mechanisms 14FL, 14FR, 14RL and 14RR are provided. The height sensors 106FL, 106FR, 106RL and 106RR monitor relative distance between the vehicular body and associated one of the suspension members of the suspension mechanisms 14FL, 14FR, 14RL and 14RR to produce front-left, front-right, rear-left and rear-right height indicative signals $H_{FL}$, $H_{FR}$, $H_{RL}$ and $H_{RR}$.

Figure 2:
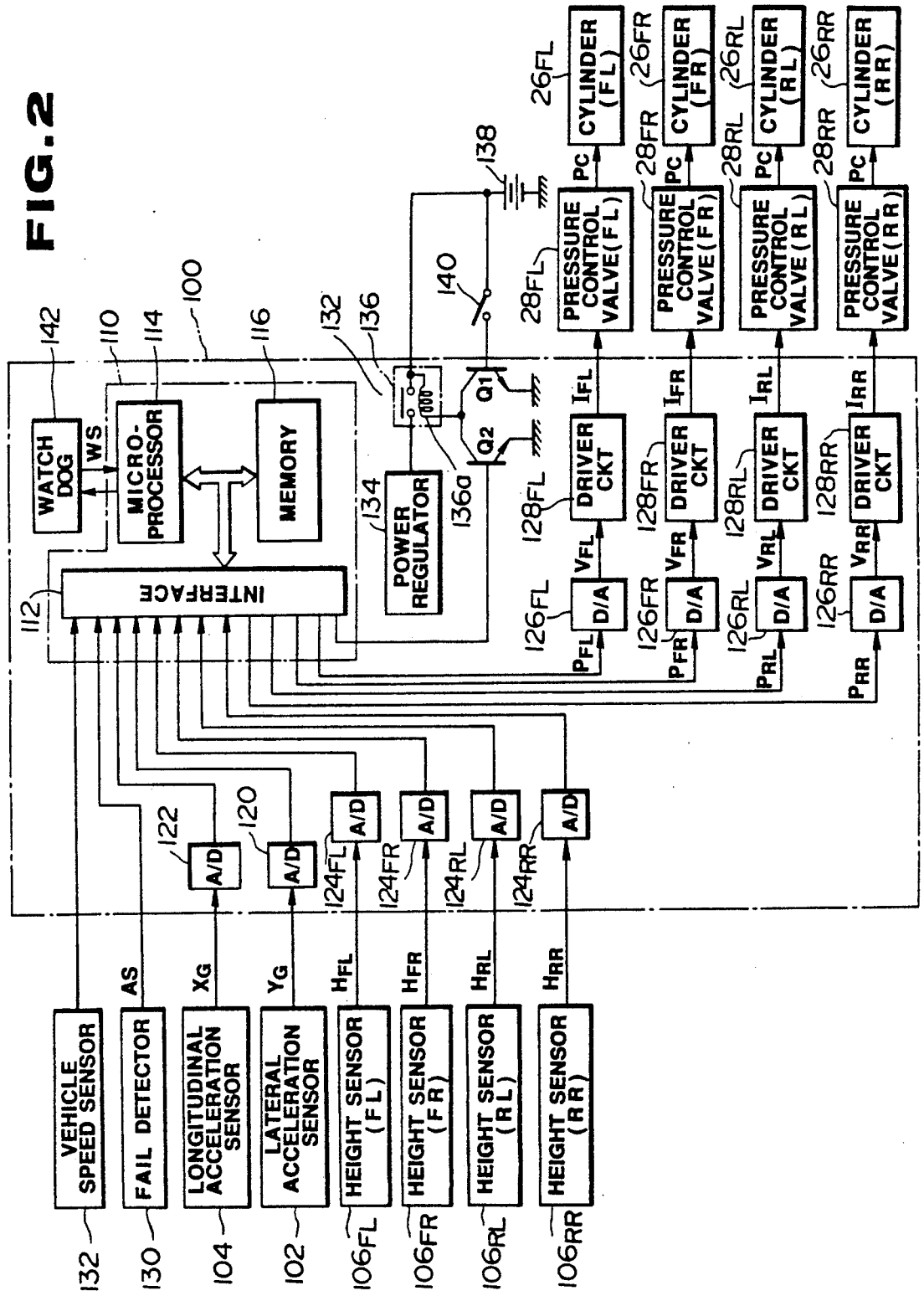
FIG. 2 is a block diagram showing a preferred construction of a control system associated with the preferred embodiment of the active suspension system of FIG. 1.

As shown in FIG. 2, the control unit 100 comprises a microcomputer 110 which includes an input/output interface 112, a microprocessor 114 and a memory unit 116. The lateral acceleration sensor 102 is connected to the input/output interface 112 of the microcomputer 110 via an analog-to-digital (A/D) interface 120. The A/D converter 120 converts the analog form lateral acceleration indicative signal $g_y$ into a lateral acceleration indicative digital signal.

On the other hand, the longitudinal acceleration sensor 104 is connected to the input/output interface 112 via an A/D converter 122. The A/D converter 122 converts the analog form longitudinal acceleration indicative signal $g_x$ into a digital form longitudinal acceleration indicative digital signal. Also, respective of the front-left, front-right, rear-left and rear-right height sensors 106FL, 106FR, 106RL and 106RR are connected to the input/output interface 112 via A/D converters 124FL, 124FR, 124RL and 124RR. The A/D converters 124FL, 124FR, 124RL and 124RR converts analog form front-left, front-right, rear-left and rear-right height indicative signals $H_{FL}$, $H_{FR}$, $H_{RL}$ and $H_{RR}$ into digital form height indicative digital signals. The microcomputer 110 processes the lateral acceleration indicative digital signals, the longitudinal acceleration digital signals and the front-left, front-right, rear-left and rear-right height indicative digital signals for deriving front-left, front-right, rear-left and rear-right suspension control commands $P_{FL}$, $P_{FR}$, $P_{RL}$ and $P_{RR}$. The suspension control commands $P_{FL}$, $P_{FR}$, $P_{RL}$ and $P_{RR}$ are converted into voltage signals $V_{FL}$, $V_{FR}$, $V_{RL}$ and $V_{RR}$ respectively representative of the commanded value of the suspension control commands, by digital-to-analog (D/A) converters 126FL, 126FR, 126RL and 126RR. The voltage signals $V_{FL}$, $V_{FR}$, $V_{RL}$ and $V_{RR}$ are supplied to driver circuits 128FL, 128FR, 128RL and 128RR. The driver circuits 128FL, 128FR, 128RL and 128RR derives the suspension control signals $I_{FL}$, $I_{FR}$, $I_{RL}$ and $I_{RR}$ which are current signal having current level corresponding to the magnitude of adjustment of the fluid pressure.

Figure 3:
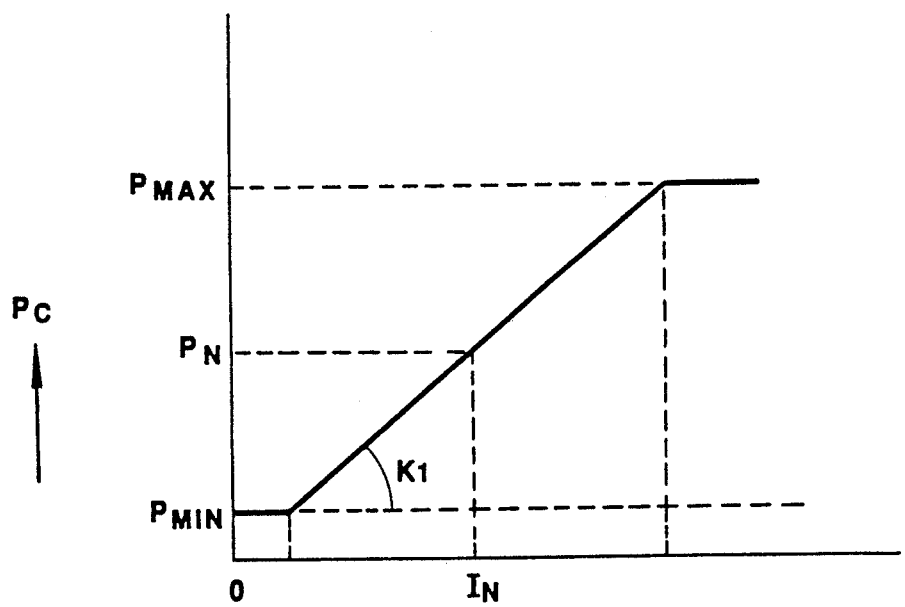
FIG. 3 is a chart showing relationship between current level of a suspension control command and fluid pressure in a working chamber in the preferred embodiment of the active suspension system.

As can be seen from FIG. 3, the current value of the suspension control signal as the current signal is variable between a predetermined minimum value $I_{MIN}$ and a predetermined maximum value $I_{MAX}$. The fluid pressure becomes minimum $P_{MIN}$ at the minimum value $I_{MIN}$ of the suspension control command and becomes maximum $P_{MAX}$ at the maximum value $I_{MAX}$ of the suspension control command. The minimum value $I_{MIN}$ of the suspension control command is set in view of noise possible superimposed on the suspension control current. As can be seen, the fluid pressure in the working chamber 26d of the hydraulic cylinder 26 linearly varies between the maximum pressure level $P_{MAX}$ and the minimum pressure level $P_{MIN}$ across a predetermined neutral pressure $P_N$ corresponding to the current level $I_N$.

A fail detector 130 is also provided in the suspension control system for monitoring operating condition and detecting abnormal condition of the system to input an abnormality detection signal AS to the input/output interface 112. The fail detector 130 is designed to detect shorting or breakage of proportioning solenoids 28e of the pressure control valve, abnormal output from the driver circuits 128$_{FL}$, 128$_{FR}$, 128$_{RL}$ and 128$_{RR}$, failure of the vehicular height sensors 106FL, 106FR, 106RL and 106RR and the longitudinal and lateral acceleration sensors 104 and 102, and so forth. Also, a vehicular speed sensor 131 is provided in the control system, as shown in FIG. 2 for monitoring vehicular speed to produce a vehicular speed indicative signal V. Furthermore, a power circuit 132 is connected to the control unit 100. The power circuit 132 includes a power regulator 134 and an ignition relay 136. The ignition relay 136 has a relay coil 136a [E] connected to a vehicular battery 138. The other end of the relay coil 136a is connected to collector electrodes of a pair of transistors $Q_1$ and $Q_2$. The transistor $Q_1$ has the base electrode connected to the battery 138 via an ignition switch 140. On the other hand, the transistor $Q_2$ has the base electrode connected to the input/output interface 112 to receive therefrom a self-holding signal $S_S$. The microprocessor 110 is also connected to a watch dog timer 142 which receives periodic signal internally produced in the microprocessor for checking the operation of the control unit. The watch dog timer 142 is connected to NMI (non-maskable interrupt) terminal of the microprocessor for supplying an abnormality indicative signal when failure of the control unit is detected.

In brief of the operation, the control unit 100 initiate operate in response to turning on of the ignition switch 140. At the initial stage, whole system is initialized. At this initialization stage, the fail-safe signal $CS_1$ and the flow control signal $CS_2$ are turned into HIGH level. At the same time, the suspension control command $P_{FL}$, $P_{FR}$, $P_{RL}$ and $P_{RR}$ are set at a predetermined initial values $P_{FL}'$, $P_{FR}'$, $P_{RL}'$ and $P_{RR}'$. The suspension control commands $P_{FL}$, $P_{FR}$, $P_{RL}$ and $P_{RR}$ having the predetermined initial value $P_{FL}'$, $P_{FR}'$, $P_{RL}'$ and $P_{RR}'$ are thus supplied to the driver circuits 128FL, 128FR, 128RL and 128RR via respectively corresponding D/A converters 126FL, 126FR, 126RL and 126RR. For an ON-set transition period, the values of the suspension control commands $P_{FL}$, $P_{FR}$, $P_{RL}$ and $P_{RR}$ are maintained at the predetermined initial values $P_{FL}'$, $P_{FR}'$, $P_{RL}'$ and $P_{RR}'$. During the On-set transition period, the fail-safe signal $CS_1$ and the flow control signal $CS_2$ are maintained HIGH level to maintain the fail-safe valve 18 at open position and the flow control valve 171 at closed position. During this ON-set transition period, the line pressure is increased at a limited rate by the fluid supplied through the flow restriction orifice 171b. The On-set transition period is set in a sufficient length for increasing the line pressure to be supplied to the pressure control valve 28 higher than or equal to the neutral pressure $P_N$. Therefore, at the end on the ON-set transition period, the operational one-way check valve 172 in the pressure holding mechanism 17 is placed at the open position for permitting the fluid flow back to the reservoir 162 via the drain line for the pilot pressure introduced from the supply line higher than or equal to the neutral pressure.

After terminating the ON-set transition period, the control unit 100 switches the flow control signal level $CS_2$ into HIGH level. Therefore, the flow control valve 171 is switched into open position for permitting pressurized fluid to flow through the supply line at full flow rate. Then, the control unit is enabled to perform normal height and vehicular attitude regulating control operation. In the normal mode of control operation, the height indicative data $H_{FL}$, $H_{FR}$, $H_{RL}$ and $H_{RR}$ are read out, Then height regulating control operation is performed by the the control unit 100. On the height regulating control operation, the respective of the height indicative data $H_{FL}$, $H_{FR}$, $H_{RL}$ and $H_{RR}$ is compared with a predetermined target height $H_S$ so that the suspension control command $P_{FL}$, $P_{FR}$, $P_{RL}$ and $P_{RR}$ necessary for adjusting the height to the target height are generated. Also, anti-rolling and anti-pitching control for regulating vehicular attitude is performed on the basis of the lateral and longitudinal acceleration data $Y_G$ and $X_G$. In the anti-rolling and anti-pitching control, anti-pitching control command $P_{YG}$ and anti-pitching control command $P_{XG}$ are derived for suppressing vehicular rolling and pitching motion.

On the other hand, when the ignition switch 140 is turned OFF, the suspension control commands $P_{FL}$, $P_{FR}$, $P_{RL}$ and $P_{RR}$ are gradually adjusted toward the predetermined initial value $P_K$.

On the other hand, the microprocessor 110 is responsive to the abnormality indicative signal AS from the fail detector or from the watch dog timer to initiate fail-safe operation. In the fail-safe operation, the fail-safe signal $CS_1$ is turned into LOW level to place the fail-safe valve 18 at the flow blocking position. At the flow blocking position of the fail-safe valve 18, the fluid flow in the drain line is permitted only through the flow restrictive orifice 183. On the other hand, the fluid flow through the supply line is completely shut-off. As a result, the line pressure in the supply line 35 is gradually decreased toward the neutral pressure. When the line pressure at the pressure control valve 28 reaches the neutral pressure, the operational one-way check valve 172 in the pressure holding mechanism 17 becomes active to turn into flow blocking position for preventing fluid flow through the drain line completely. Therefore, completely closed circuit is established across the fail-safe valve 18, the pressure control valves 28 and the working chambers 26d. AT this position, since the back pressure absorbing accumulators 24F and 24R absorbs certain part of the pressurized fluid, the fluid pressure in the closed circuit is maintained slightly below the neutral pressure $P_N$. At this position, respective suspension system may operates as passive suspension system for generating damping force resisting against relative displacement between the vehicular body and the road wheel depending upon the piston speed and piston stroke magnitude. When cause of abnormality is cured or disappear, the abnormality indicative signal from the fail detector 130 or the watch dog timer 142 is terminated. Therefore, active suspension control can be resumed. However, as set out in the introduction of the disclosure, if control mode is simply switched from fail-safe mode to the normal active suspension control mode regardless of the vehicular driving condition, undesirable change of suspension characteristics which brings degradation of vehicular driveability, may be caused at certain vehicular condition. Therefore, in the shown embodiment, vehicular driving condition is continuously monitored so as to permit resumption of normal active suspension control at predetermined vehicular driving condition which is stable enough so as not to cause significant affect of variation of the suspension characteristics for the vehicular driveability. For instance, in the shown embodiment, resumption of the active suspension control from the fail-safe mode operation is permitted when one of the following condition is satisfied.

Vehicle is not running or is traveling in straight which may not cause vehicular attitude change;

Vehicle is not running and the ignition switch 140 is switched from OFF position to ON position;

Vehicle is not running and brake is applied; or

Vehicle is not running and all vehicular doors are closed.

By resuming normal active suspension control only when one of the foregoing condition is satisfied, change of the suspension characteristics due to switching of control mode from the fail-safe mode to the normal active suspension control mode may not affect for vehicular driveability.

The following is a detail of the suspension control routine to be executed by the control unit 100 in the shown embodiment of the active suspension system, according to the invention.

Figure 4:
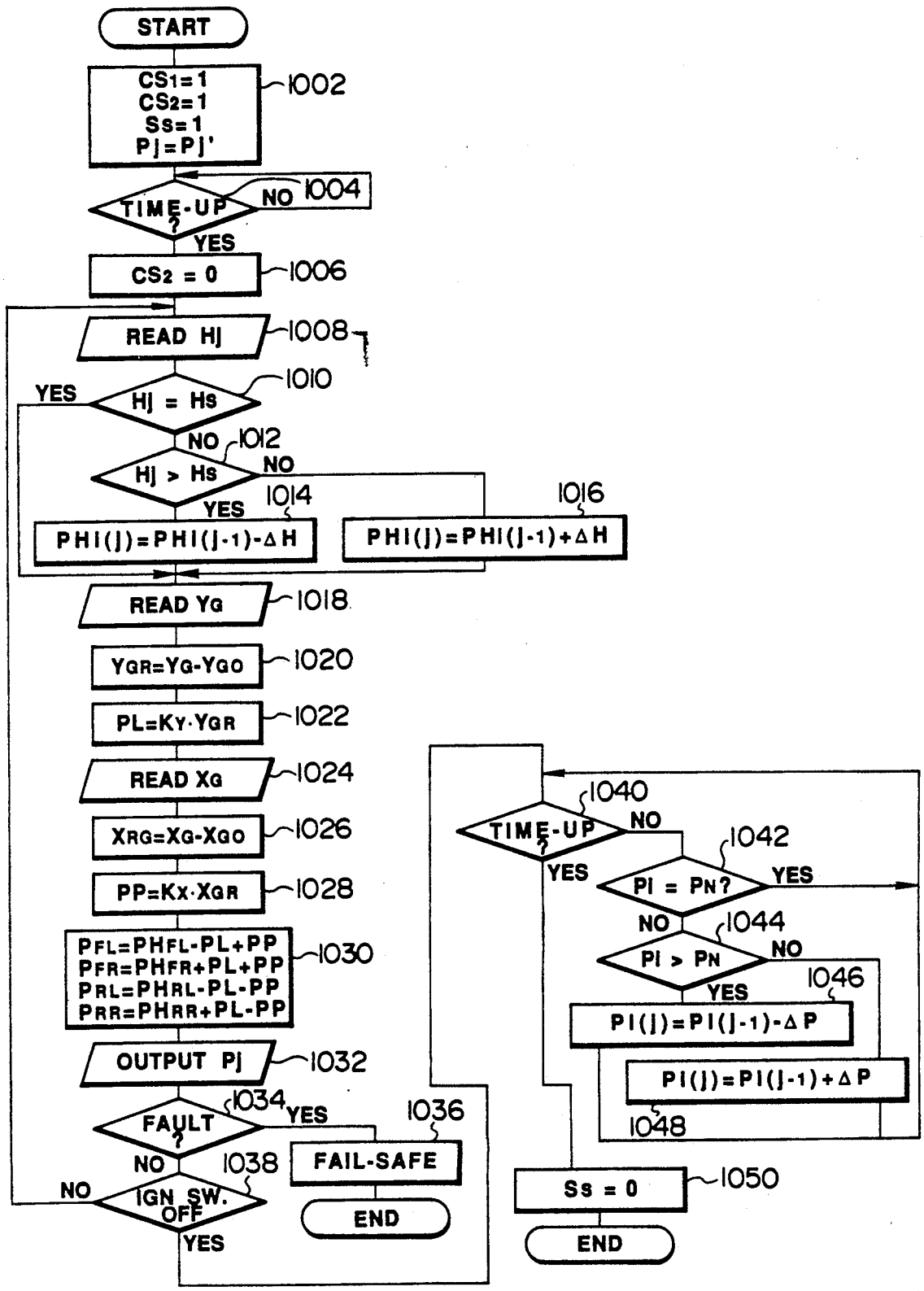
FIG. 4 is a flowchart showing a rolling control routine for deriving the suspension control command.

FIG. 4 shows a routine to be executed by the microprocessor 110 in the control unit 100 of the shown embodiment of the active suspension system. As can be appreciated, the shown routine may be programmed as one of interrupt routines to be executed by interrupting a main program which governs a plurality of routines. Therefore, the shown routine may be executed periodically at a given interval.

Initially, the shown routine is triggered in response to turning ON of the ignition switch 140. Namely, upon ON-set of the ignition switch 140, the transistor $Q_1$ of the power circuit 132 is turned ON. In response to this, the ignition relay 136 is turned ON. Therefore, power supply for the control unit 100 is initiated.

Immediately after starting execution, the fail-safe signal $CS_1$, the flow control signal $CS_2$ and the self-holding signal $S_S$ are respectively switched into HIGH level at a step 1002. By this, the fail-safe valve 18 is placed at open position for permitting fluid flow through the supply line 35 and the drain line 37. On the other hand, the flow control valve 171 is responsive to the HIGH level flow control signal $CS_2$ to be placed at the flow blocking position. Therefore, the pressurized fluid flows only through the flow restriction orifice 171b for supplying limited flow rate of the working fluid for the pressure control valves 28FL, 28FR, 28RL and 28RR. Then, at a step 1004, an elapsed time after turning on the ignition switch 140 is checked. Checking of the elapsed time at the step 1004 is repeated until the elapsed time reaches a predetermined ON-set transition period. The predetermined ON-set transition period is set for a sufficient time required for rising the line pressure at the pressure control valves 28 higher than or equal to the neutral pressure $P_N$. Therefore, within the ON-set transition period, the line pressure is increased across the neutral pressure. The operational one-way check valve 172 is thus placed at open position for permitting fluid flow through the drain line. When the elapsed time reaching the ON-set transition period is detected at the step 1004, the flow control signal $CS_2$ is switched into LOW level to place the flow control valve 171 at the open position, at a step 1006. After detecting the expiration of the ON-set transition period as checked at a step 1006, the process goes to a step 1008 to read the the height indicative data $H_{FL}$, $H_{FR}$, $H_{RL}$ and $H_{RR}$ which will be generally represented by $H_j$. At a step 1010, the height indicative data $H_j$ as read at the step 1008 are compared with a target height representative value $H_S$ which represents a predetermined target height. If the height indicative data $H_j$ is not equal to the target height $H_S$ as checked at the step 1010, then check is performed whether the height indicative data $H_j$ is greater than the target height $H_S$, at a step 1012. If the height indicative data $H_j$ is greater than the target height $H_S$, the height control command value $PH_{FL}$, $PH_{FR}$, $PH_{RL}$ and $PH_{RR}$ which will be generally represented by $PH_j$, are derived by subtracting the height variation indicative value $\Delta H$ from the previously derived height control command value derived in the immediately preceding execution cycle, at a step 1014. Otherwise, at a step 1016, the height control command value $PH_j$ are derived by adding the height variation indicative value $\Delta H$ to the previously derived height control command value derived in the immediately preceding execution cycle.

When the height indicative data $H_j$ is equal to the target height $H_S$ as checked at the step 1010 or after the process at one of the steps 1014 and 1016, the lateral acceleration indicative data $Y_G$ which is derived from the lateral acceleration indicative signal $y_g$ by A/D conversion, is read out at a step 1018. Based on the lateral acceleration indicative data $Y_G$, a rolling magnitude indicative data $Y_{GR}$ is derived. Practically, the rolling magnitude indicative data $Y_{GR}$ is derived by subtracting a neutral position lateral acceleration value $Y_{GO}$ from the instantaneous lateral acceleration indicative data $Y_G$ at the position where the lateral acceleration on the vehicular body is zero (0) from the lateral acceleration indicative data $Y_G$, at a step 1020. By this, the rolling magnitude indicative data $Y_{GR}$ represents both of the vehicular rolling magnitude and the vehicular rolling direction. Thereafter, by multiplying the rolling magnitude indicative data $Y_G$ with a control coefficient $K_Y$, anti-rolling control command value $P_L$ is derived at a step 1022. The longitudinal acceleration indicative data $X_G$ which is derived from the longitudinal acceleration indicative signal $x_g$ by A/D conversion, is read out at a step 1024. Based on the longitudinal acceleration indicative data $X_G$, a pitching magnitude indicative data $X_{GR}$ is derived. Practically, the pitching magnitude indicative data $X_{GR}$ is derived by subtracting a neutral position longitudinal acceleration value $X_{GO}$ at the position where the longitudinal acceleration on the vehicular body is zero (0) from the longitudinal acceleration indicative data $X_G$, at a step 1026. By this, the pitching magnitude indicative data $X_{GR}$ represents both of the vehicular pitching magnitude and the vehicular pitching direction. Thereafter, by multiplying the pitching magnitude indicative data $X_{GR}$ with a control coefficient $K_X$, anti-pitching control command value $P_P$ is derived at a step 1028.

After the process at the step 1028, the suspension control command values $P_{FL}$, $P_{FR}$, $P_{RL}$ and $P_{RR}$ are derived at a step 1030. Practically, the suspension control command values $P_{FL}$, $P_{FR}$, $P_{RL}$ and $P_{RR}$ are calculated with the following equations:

$$P_{FL} = PH_{FL} - P_L + P_P,$$

$$P_{FR} = PH_{FR} + P_L + P_P,$$

$$P_{RL} = PH_{RL} - P_L - P_P,$$

$$P_{RR} = PH_{RR} + P_L - P_P.$$

The suspension control command $P_{FL}$, $P_{FR}$, $P_{RL}$ and $P_{RR}$ with the control valve thus derived are output at a step 1032.

At a step 1034, the abnormality indicative signals from the fail detector 130 and the watch dog timer 142 are checked. If abnormality is detected at the step 1034, the fail-safe control routine is initiated at a step 1036.

Figure 5:
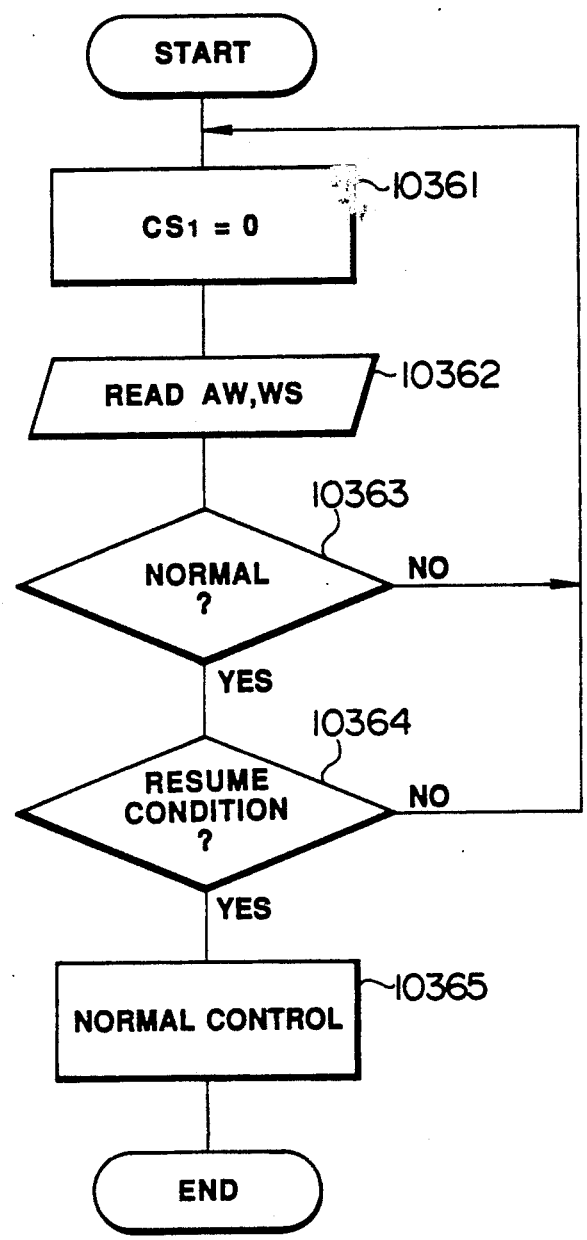
FIG. 5 is a flowchart showing a routine of fail-safe operation for forming fail-safe operation.

The fail-safe routine is illustrated in FIG. 5. The shown fail-safe routine is triggered at the step 1036 as set forth above. Immediately after starting execution, the fail-safe signal $CS_1$ is set at LOW level at the step 10361. Then, at a step 10362, the abnormality indicative signals AW and WS from the fail detector 130 and the watch dog timer 142 are read out. At a step 10363, check is performed against the abnormality indicative signals AW and WS whether both of the abnormality indicative signals are LOW level. If either of the abnormality indicative signals AW and WS is HIGH level as checked at the step 10363, process returns to the step 10361. On the other hand, if both of the abnormality indicative signals AW and WS are LOW level as checked at the step 10363, then vehicular driving condition is checked at a step 10364 whether the current vehicle driving condition satisfies the preset control resuming condition. In the shown routine, the vehicular speed is taken as a parameter representative of the vehicle driving condition associated with the preset control resuming condition.

At a step 10364, the vehicle speed indicative data V is read out. Then, the vehicle speed indicative data V is compared with a predetermined vehicle speed threshold $V_S$ which represents very low vehicle speed at which variation of the suspension characteristics should not affect for vehicular driving behavior. If the vehicle speed indicative data is greater than the predetermined vehicle speed threshold $V_S$, process returns to the step 10361. On the other hand, when the vehicle speed indicative data V is smaller than or equal to the predetermined vehicle speed threshold $V_S$ as checked at the step 10364, process returns to the routine of FIG. 4.

On the other hand, when the abnormality cannot be detected as checked at the step 1034, the position of the ignition switch 140 is checked at a step 1038. If OFF state of the ignition switch 140 is detected at the step 1038, then process returns to the step 1008. On the other hand, if the ignition switch 140 is in ON position, an elapsed timer after turning OFF the ignition switch 140 is checked at a step 1040 whether the elapsed time reaches a predetermined OFF-set transition period. When elapsed time is shorter than the OFF-set transition period as checked at the step 1040, the suspension control command value $P_j$ is checked whether it is equal to the neutral pressure $P_N$ at a step 1042. If the suspension control command value $P_j$ is equal to the neutral pressure $P_N$, process returns to the step 1040. On the other hand, if the suspension control command value $P_j$ is not equal to the neutral pressure $P_N$, then check is performed whether the suspension control command value $P_j$ is greater than the set pressure $P_N$ at a step 1044. When the suspension control command $P_j$ is greater than the neutral pressure $P_N$, then, the suspension control command value $P_j$ is derived by subtracting a predetermined value $\Delta P$ from the preceding value of the suspension control command derived in the immediately preceding cycle, at a step 1046. On the other hand, when the suspension control command value $P_j$ is smaller than the neutral pressure $P_N$ as checked at the step 1044, then the suspension control command value $P_j$ is derived by adding the predetermined value $\Delta P$ at a step 1048. After the process at one of the steps 1046 and 1048, process also returns to the step 1040. Therefore, the process at the steps 1040 to 1048 are repeated until the suspension control command value $P_j$ is adjusted at the neutral pressure $P_N$ at a step 1050. Thereafter, process goes END.

When the vehicle stops at a flat road with maintaining the ignition switch 140 at OFF position for a period longer than the OFF-set transition period, the pressure source unit 16 is maintained inoperative position because of stopping of the engine. Therefore, the line pressure in the supply line 35 supplied from the pressure source unit 16 is maintained zero. At this condition, due to the line pressure in the supply line lower than or equal to the neutral pressure, the operational one-way check valve 172 is maintained at shut-off state, At this time, the operational one-way check valve 172 stays at closed position for blocking fluid flow therethrough.

By turning ON of the ignition switch 140 at this position, power supply is initiated to resume control operation of the control unit 100. At the same time, the engine starts to run for driving the fluid pump 161. Therefore, supply pressure from the pressure source unit 16 is gradually increased according to increasing of the engine revolution speed. Also, the microprocessor 110 of the control unit 100 initiate suspension control operation.

At this state, both of the flow control signal $CS_2$ and the fail-safe signal $CS_1$ are set at HIGH level during initialization process at the step 1002. Therefore, the fail-safe valve 18 is operated into open position and the flow control valve 171 is operated into shut-off position. As a result, the fluid pressure supplied from the pressure source unit 16 is supplied to the pressure control valve 28 via the flow restriction orifice 171b. Therefore, limited flow rate of pressurized fluid is supplied to the pressure control valve 28 for moderately increase the fluid pressure. Accordingly, the fluid pressure in the working chamber 26d of respective cylinders 26 is also moderately increased.

While the line pressure is increased across the neutral pressure $P_N$, the operational one-way check valve 172 opens to permit the fluid flow through the drain line 37. After expiration of the predetermined ON-set transition period, the flow control signal $CS_2$ is switched into LOW level to place the flow control valve 171 in conductive state for permitting fluid flow therethrough. Therefore, the pressure control valve 28 is enabled to control the fluid pressure in the working chamber.

On the other hand, as set forth above, the microprocessor 110 maintains the suspension control command values at the initial values $P_{FL}'$, $P_{FR}'$, $P_{RL}'$ and $P_{RR}'$ substantially corresponding to the neutral pressure $P_N$ until the ON-set transition period expires. Therefore, the suspension control signal values $I_{FL}$, $I_{FR}$, $I_{RL}$ and $I_{RR}$ output from the driver circuits 128FL, 128FR, 128RL and 128RR are maintained at the values corresponding the initial suspension control command values $P_{FL}'$, $P_{FR}'$, $P_{RL}'$ and $P_{RR}'$. As will be appreciated from the foregoing discussion, since the initial suspension control command values $P_{FL}'$, $P_{FR}'$, $P_{RL}'$ and $P_{RR}'$ are set substantially at the neutral pressure $P_N$. After expiration of the ON-set transition period, the height regulating control, anti-rolling control and anti-pitching control is performed on the basis of the height indicative data $H_j$, the lateral acceleration indicative data $Y_G$ and the longitudinal acceleration indicative data $X_G$. Manner of height regulation control, anti-rolling control and anti-pitching control have been disclosed in various foregoing co-pending U.S. Patent Applications. Therefore, all disclosures touching height regulation control, anti-rolling control, anti-pitching control and so forth discussed in the associated U.S. Patent Applications are herein incorporated by reference for the sake of disclosure.

On the other hand, when the ignition switch 140 is turned OFF, the engine stops running. Accordingly, the fluid pump 161 in the pressure source unit 16 cease driving. However, by the effect of the one-way check valve 174 in the pressure holding mechanism 17, the abrupt drop of the line pressure at the pressure control valves 28 can be successfully prevented.

On the other hand, since the self-holding signal $S_S$ is maintained HIGH level for the given OFF-set transition period until the operational one-way check valve 172 is shut and thus the pressure level indicative signal level turns into LOW level, for gradually adjusting the line pressure at the pressure control valves 28 substantially at or in the vicinity of the neutral pressure. Subsequently, when the line pressure drops to the neutral pressure $P_N$, the operational one-way check valve switches the valve position to flow blocking state. At this position, since part of the fluid in the drain line 37 flows into the back pressure absorbing pressure accumulators 24F and 24R, the pressure at the pressure control valve is maintained slightly lower than the neutral pressure $P_N$.

On the other hand, when the failure of the system is detected by the fail detector 130, the fail-safe signal $CS_1$ is switched into LOW level to place the fail-safe valve 18 at the flow blocking state. Then, since the inlet port of the pressure control valve comes into communication with the operational check valve 172 via the flow restriction orifices 183. Therefore, the pilot pressure $P_P$ corresponding to the line pressure in the supply line 20 drops to the neutral pressure $P_N$ to cause shutting down of the operational one-way check valve. Therefore, the hydraulic circuit across the working chamber and the pressure control valves becomes closed. Therefore, the pressure in the closed circuit can be maintained slightly below or in the vicinity of the neutral pressure.

At this condition, when the vehicular load is substantially standard, the vehicular height can be maintained in the vicinity of the target height. Furthermore, shock absorbing effect substantially equivalent to the conventional passive type shock absorber can be achieved by inducing fluid flow with flow restriction in the closed circuit. On the other hand, during fail-safe operation, state of the abnormality indicative signal from the fail detector and from the watch dog timer are continuously monitored to detect disappearing of the abnormality indicative signal. When the disappearing of the abnormality indicative signal is detected, the vehicular driving condition is checked. As set forth, in the shown embodiment, normal active suspension control is resumed when vehicle is not running or is traveling in straight which may not cause vehicular attitude change, when vehicle is not running and the ignition switch 140 is switched from OFF position to ON position, when vehicle is not running and brake is applied, or when vehicle is not running and all vehicular doors are closed. Since such vehicular condition will not be affected by sudden variation of the suspension characteristics, vehicular driveability can be assured.

While the present invention has been discussed in terms of the preferred embodiment of the invention, the invention can be embodied in various fashion. Therefore, the invention should not be appreciated to be specified to the specific embodiment discussed hereabove. Therefrom the invention should cover all possible embodiments and modifications which can implemented without departing from the principle of the invention.

For instance, while the shown embodiment employs the vehicular speed as principle parameter for making judgement whether active suspension control can be resumed, any appropriate parameters can be selected for detecting vehicular stable condition for enabling switching of control mode from the fail-safe mode to the normal active suspension control mode. Furthermore, it may be possible to directly monitor the valve position of the operational one-way check valve for generating the HIGH level pressure level indicative signal while the operational one-way check valve is maintained at open position. In addition, though the pressure holding mechanism in the shown embodiment comprises the electromagnetically operable flow control valve and the flow restrictive orifice, the flow control valve may also comprise a pilot operated valve. Furthermore, the position of the pressure holding mechanism may not be specified to the shown position but can be any appropriate position convenient for equivalent flow control operation. Furthermore, the flow restriction orifice is not essential to be provided. For example, when a flow restriction orifice is provided between the P port and A port of the fail-safe valve, the flow restriction orifice parallel to the flow control valve can be neglected. In addition, though the shown embodiment employs the engine driven fluid pump, it can be replaced with an electrically driven fluid pump. Also, the present invention may be implemented any type of pressure control valve or flow control serve unit performing equivalent pressure control function.

In addition, it should be appreciated, the present invention is applicable for active suspension systems which are disclosed in the co-pending U.S. Patent Applications both are entitled "ACTIVE SUSPENSION SYSTEM WITH ENHANCED SUSPENSION CONTROL CHARACTERISTICS AT ON/OFF TRANSITION OF SUSPENSION CONTROL" corresponding to Japanese Patent Applications Nos., both are filed on Aug. 31, 1989. Therefore, the disclosure of the above-identified two co-pending U.S. Patent Applications are incorporated by reference.

For instance, it is possible to control ON- and OFF set transition by maintaining the pressure holding valve means, i.e., flow control valve and the operational one-way check valve, in conductive state for a given period in which the fluid pressure in a working chamber is gradually adjusted toward a predetermined neutral pressure level after turning OFF of a power switch. The pressure holding valve is, on the other hand, maintained in non-conductive state for a given period until the fluid pressure is adjusted to the neutral pressure after turning ON of the power switch. The system further includes a detector means for detecting resumption of power supply after a short period of turning OFF of the power supply. A control system is responsive to the detecting means detecting the resumption of power supply after power OFF state for a period shorter than the given period fir performing short period resumption mode control operation by maintaining the pressure holding valve at the conductive state and setting the instantaneous fluid pressure in the working chamber as an initial pressure level.

Figure 6:
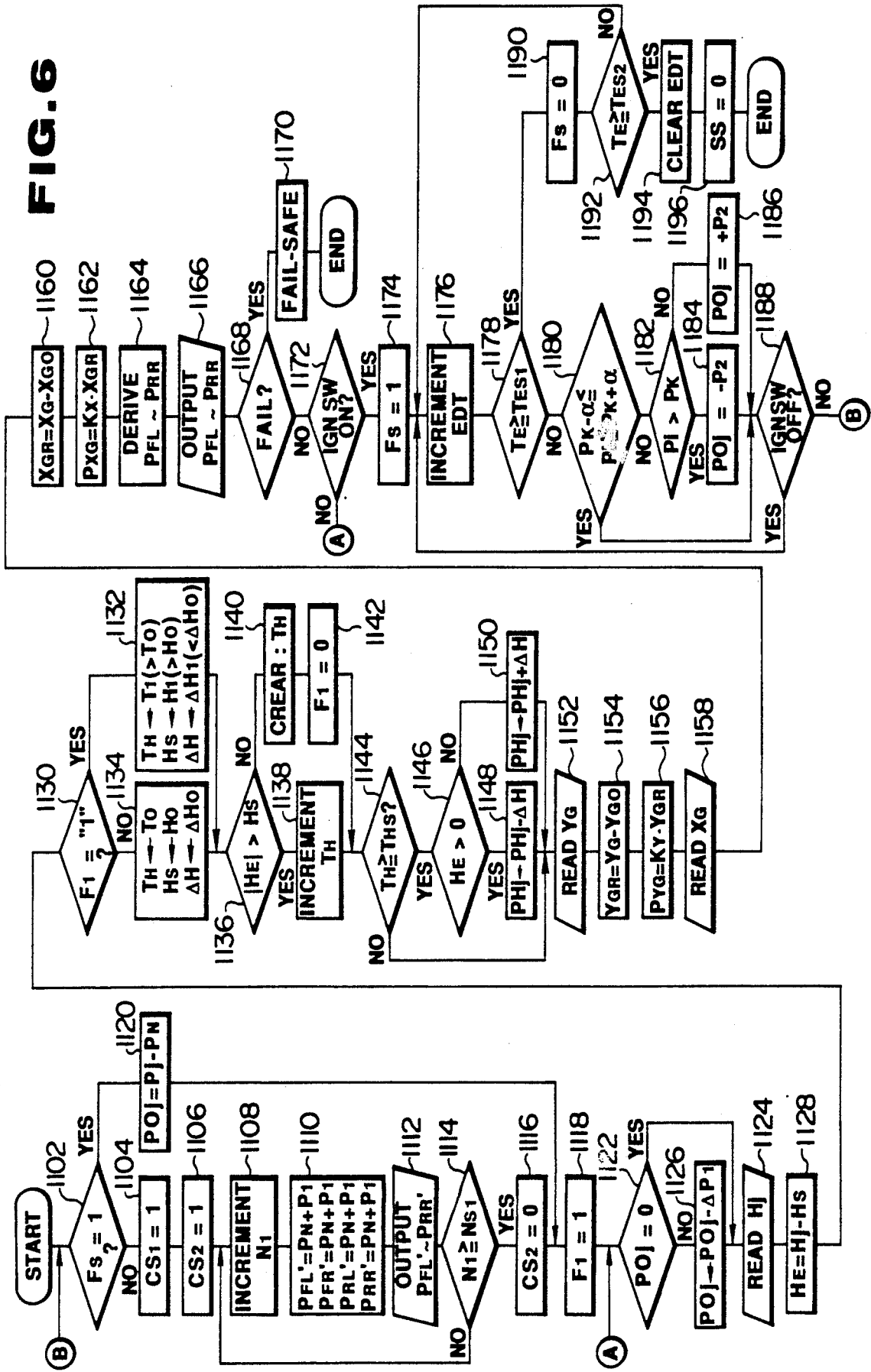
FIG. 6 is a flowchart showing a another rolling control routine for deriving the suspension control command, for which the shown embodiment of fail-safe system is applicable.

FIG. 6 shows a routine to be executed by the microprocessor 110 in the control unit 100 of the shown embodiment of the active suspension system. As can be appreciated, the shown routine may be programmed as one of interrupt routines to be executed by interrupting a main program which governs a plurality of routines. Therefore, the shown routine may be executed periodically at a given interval.

Initially, the shown routine is triggered in response to turning ON of the ignition switch 140. Namely, upon ON-set of the ignition switch 140, the transistor $Q_1$ of the power circuit 132 is turned ON. In response to this, the ignition relay 136 is turned ON. Therefore, power supply for the control unit 100 is initiated.

Immediately after starting execution, a short period re-starting indicative flag $F_S$ which represents turning ON of the ignition switch after a shorter period that a predetermined period after turning OFF of the ignition switch 140 to establish pressure holding position of the pressure holding mechanism 17, is checked at a step 1102. When the short period re-starting indicative flag $F_S$ is not set as checked at the step 1102. Then, judgment can be made that the pressure holding mechanism 17 is in the pressure holding state. Then, the fail-safe signal $CS_1$ is switched into HIGH level to place the fail-safe valve at open position for permitting fluid flow through the supply line 35 and the drain line 37, at a step 1104. Also, at a step 1106, the flow control signal $CS_2$ is switched into HIGH level to place the flow control valve 170 at the flow blocking position. Therefore, the pressurized fluid flows only through the flow restriction orifice 171b for supplying limited flow rate of the working fluid for the pressure control valves 28FL, 28FR, 28RL and 28RR. Thereafter, a initial period timer $N_I$ is incremented at a step 1108. Subsequently, the suspension control commands $P_{FL}$, $P_{FR}$, $P_{RL}$ and $P_{RR}$ are set at an initial values $P_{FL}'$, $P_{FR}'$, $P_{RL}'$ and $P_{RR}'$ at a step 1110.

Here, in general, the suspension control command values $P_{FL}$, $P_{FR}$, $P_{RL}$ and $P_{RR}$ are derived on the basis of the neutral pressure $P_N$, height control value $PH_{FL}$, $PH_{FR}$, $PH_{RL}$ and $PH_{RR}$ which are derived on the basis of the difference between the target height $H_S$ and the height indicative data $H_{FL}$, $H_{FR}$, $H_{RL}$ and $H_{RR}$, the anti-rolling control value $P_{YG}$, the anti-pitching control value $P_{XG}$, and off-set command value $PO_{FL}$, $PO_{FR}$, $PO_{RL}$ and $PO_{RR}$ which represents required off-set pressure from the neutral pressure $P_N$ set for compensating lag time of pressure adjustment. The manner of derivation of the suspension control commands $P_{FL}$, $P_{FR}$, $P_{RL}$ and $P_{RR}$ can be expressed by the following equations:

$$P_{FL} = P_N + PH_{FL} - P_{YG} + P_{XG} + PO_{FL} \quad (1)$$

$$P_{FR} = P_N + PH_{FR} - P_{YG} + P_{XG} + PO_{FR} \quad (2)$$

$$P_{RL} = P_N + PH_{RL} - P_{YG} + P_{XG} + PO_{RL} \quad (3)$$

$$P_{RR} = P_N + PH_{RR} - P_{YG} + P_{XG} + PO_{RR} \quad (4)$$

Here, at the initial stage upon ON-set of the ignition switch 140, the height control values $PH_{FL}$, $PH_{FR}$, $PH_{RL}$ and $PH_{RR}$, the anti-rolling control value $P_{YG}$ and the anti-pitching control value $P_{XG}$ are maintained zero (0). Therefore, assuming the initial off-set value $PO_{FL}$, $PO_{FR}$, $PO_{RL}$ and $PO_{RR}$ are respectively $P_I$, the foregoing equation can be modified for deriving the initial suspension control command values $P_{FL}'$, $P_{FR}'$, $P_{RL}'$ and $P_{RR}'$ $$P_{FL} = P_N + P_I \quad (5)$$

$$P_{FR} = P_N + P_I \quad (6)$$

$$P_{RL} = P_N + P_I \quad (7)$$

$$P_{RR} = P_N + P_I \quad (8)$$

Therefore, at a step 1110, the suspension control command values $P_{FL}'$, $P_{FR}'$, $P_{RL}'$ and $P_{RR}'$ are derived by the foregoing equations (5) to (8). Then, the suspension control commands $P_{FL}$, $P_{FR}$, $P_{RL}$ and $P_{RR}$ with the derived values $P_{FL}'$, $P_{FR}'$, $P_{RL}'$ and $P_{RR}'$ are output at a step 1112. Thereafter, at a step 1114, the initial period timer value $N_I$ is compared with a predetermined set initial period value $N_{SI}$ which represents an ON-set period for maintaining the pressure holding mechanism 17 at the pressure holding position after switching of the ignition switch 140 into ON position. In practice, the ON-set period is set at several seconds in the preferred embodiment. When the initial period timer value $N_I$ is smaller than the set initial period value $N_{SI}$, the process returns to the step 1108. Therefore, the process through the steps 1108 to 1114 is repeated until the initial period timer value $N_I$ reaches the set initial period value $N_{SI}$. When the initial period timer value $N_I$ becomes greater than or equal to the set initial period value $N_{SI}$ as checked at the step 1114, the flow control signal $CS_2$ is switched into LOW level for operating the flow control valve 171 in the pressure holding mechanism 17 into open position. Thereafter, the initial stage indicative flag $F_1$ is set at a step 1118.

On the other hand, when the short period restarting indicative flag $F_S$ as checked at the step 1102 is set, then the off-set command values $PO_{FL}$, $PO_{FR}$, $PO_{RL}$ and $PO_{RR}$ which are generally represented by $PO_j$, are derived at a step 1120. In practice, the off-set command values $PO_{FL}$, $PO_{FR}$, $PO_{RL}$ and $PO_{RR}$ are calculated from the following equations:

$$PO_j = P_j - P_N$$

where $P_j$ generally represents $P_{FL}$, $P_{FR}$, $P_{RL}$ and $P_{RR}$ After the process at the step 1120, process jumps to the step 1118.

AT a step 1122, the off-set command values $PO_j$ is checked if the value thereof is zero. When, the odd-set command value $PO_j$ is zero as checked at the step 1122, then, the height indicative data $H_{FL}$, $H_{FR}$, $H_{RL}$ and $H_{RR}$ which will be generally represented by $H_j$, at a step 1124. On the other hand, when the off-set command value $PO_j$ is not zero as checked at the step 1122, the off-set command value is reduced by subtracting $\Delta P_1$ at a step 1126. After process at the step 1126, process goes to the step 1124.

At a step 1128, a height difference $H_E$ is derived by subtracting the target height value $H_S$ from the height indicative data $H_j$ at a step 1128. Then, the initial stage indicative flag $F_1$ is checked at the step 1130. When the initial stage indicative flag $F_1$ is set at the step 1130, a height adjustment threshold value [E]T[−]TH and the target height value $H_S$ are set smaller value than $T_1$ and $H_1$. On the other hand, the a height variation indicative value $\Delta H$ is set at greater values than $\Delta H_1$, at a step 1132. On the other hand, when the initial stage indicative flag $F_1$ is not set as checked at the step 1130, then, height adjustment judgment period $T_{TH}$, the target height value $H_S$ and a height variation indicative value $\Delta H$ are respectively set at greater values $T_0 (> T_1)$, $H_1 (> H_0)$ and $\Delta H_1 (> \Delta H_1)$ at a step 1134.

After process of one of the steps 1132 and 1134, the absolute value of the height difference $|H_E1|$ is compared the target height value $H_S$, at a step 1136. When the absolute value $|H_E|$ of the height difference is greater than the target height $H_S$, a height adjustment timer $T_H$ is incremented by one at a step 1138. On the other hand, when the absolute value $|H_E|$ of the height difference is smaller than or equal to the target height value $H_S$, the height adjustment timer value $T_H$ is cleared at a step 1140. Thereafter, the initial stage indicative flag $F_1$ is rest at a step 1142.

Then, at a step 1144, the height adjustment timer value $T_H$ is compared with the height adjustment threshold value $T_{TH}$ at a step 1144. If the height adjustment timer value $T_H$ is greater than or equal to the height adjustment threshold value $T_{TH}$, then, the height difference $H_E$ is checked whether it is zero (0) or not at a step 1146. Thereafter, at a step 1148, the height control command value $PH_{FL}$, $PH_{FR}$, $PH_{RL}$ and $PH_{RR}$ which will be generally represented by $PH_j$, are derived by subtracting the height variation indicative value $\Delta H$ from the previously derived height control command value derived in the immediately preceding execution cycle. Otherwise, at a step 1150, the height control command value $PH_j$, are derived by adding the height variation indicative value $\Delta H$ to the previously derived height control command value derived in the immediately preceding execution cycle.

When the height adjustment timer value $T_H$ is smaller than the height adjustment threshold value $T_{TH}$ as checked at the step 1144 or after the process at one of the steps 1148 and 1150, the lateral acceleration indicative data $Y_G$ which is derived from the lateral acceleration indicative signal $y_g$ by A/D conversion, is read out at a step 1152. Based on the lateral acceleration indicative data $Y_G$, a rolling magnitude indicative data $Y_G$ is derived. Practically, the rolling magnitude indicative data $Y_G$ is derived by subtracting a neutral position lateral acceleration value $Y_{GO}$ at the position where the lateral acceleration on the vehicular body is zero (0) from the lateral acceleration indicative data $Y_G$, at a step 1154. By this, the rolling magnitude indicative data $Y_G$ represents both of the vehicular rolling magnitude and the vehicular rolling direction. Thereafter, by multiplying the rolling magnitude indicative data $Y_G$ with a control coefficient $K_Y$, anti-rolling control command value $P_{YG}$ is derived at a step 1156. The longitudinal acceleration indicative data $X_G$ which is derived from the longitudinal acceleration indicative signal $x_g$ by A/D conversion, is read out at a step 1158. Based on the longitudinal acceleration indicative data $X_G$, a rolling magnitude indicative data $X_{GR}$ is derived. Practically, the rolling magnitude indicative data $X_{GR}$ is derived by subtracting a neutral position longitudinal acceleration value $X_{GO}$ at the position where the longitudinal acceleration on the vehicular body is zero (0) from the longitudinal acceleration indicative data $X_G$, at a step 1160. By this, the rolling magnitude indicative data $X_{GR}$ represents both of the vehicular rolling magnitude and the vehicular rolling direction. Thereafter, by multiplying the rolling magnitude indicative data $X_{GR}$ with a control coefficient $K_X$, anti-rolling control command value $P_{XG}$ is derived at a step 1162.

After the process at the step 1162, the suspension control command values $P_{FL}$, $P_{FR}$, $P_{RL}$ and $P_{RR}$ are derived at a step 1164. The suspension control command $P_{FL}$, $P_{FR}$, $P_{RL}$ and $P_{RR}$ with the control valve thus derived are output at a step 1166.

At a step 1168, the abnormality indicative signals from the fail detector 130 and the watch dog timer 142 are checked. If abnormality is detected at the step 1168, the fail-safe signal $CS_1$ is set at LOW level at the step 1170. At the same time, a self-holding signal $S_S$ for maintaining power supply for a predetermined OFF-set period after turning OFF of the ignition switch 140, is switched into LOW level at the step 1170. Then, process goes END.

On the other hand, when the abnormality cannot be detected as checked at the step 1168, the position of the ignition switch 140 is checked at a step 1172. If OFF state of the ignition switch 140 is detected at the step 1172, then process returns to the step 1122. On the other hand, if the ignition switch 140 is in ON position, the short period re-starting indicative flag $F_S$ is set at a step 1174.

At a step 1176, an end timer value $T_E$ is incremented. Then, the end timer value $T_E$ is compared with a first end timer threshold $T_{ES1}$ at a step 1178. When, the end timer value $T_E$ is smaller than the first end timer threshold $T_{ES1}$, the suspension control command value $P_j$ is checked whether it is within a predetermined range $\pm \alpha$ of a predetermined set pressure $P_K$ at a step 1180. When the suspension control command $P_j$ is not within the predetermined range $(P_K - \alpha \leq P_j \leq P_K + \alpha)$, then check is performed whether the suspension control command value $P_j$ is greater than the set pressure $P_K$ at a step 1182. When the suspension control command $P_j$ is greater than the set pressure $P_K$, then, the off-set command value $PO_j$ is set at a predetermined value $-P_2$, at a step 1184. On the other hand, when the suspension control command value $P_j$ is greater than the set pressure $P_K$, then the off-set command value $PO_j$ is set at a predetermined value $+P_2$ at a step 1186. After the process at one of the steps 1184 and 1186 or when the suspension control command value $P_j$ is within the predetermined range $(P_K - \alpha \leq P_j \leq P_K + \alpha)$ as checked at the step 1180, then check is performed whether the ignition switch 140 is in OFF position at a step 1188. If the ignition switch position as checked at the step 1188 is OFF, then process returns to the step 1176. On the other hand, when the ignition switch at ON position is detected at the step 1188, then process returns to the step 1102. On the other hand, when the end timer value $T_E$ is greater than or equal to the first end timer threshold $T_{ES1}$ as checked at the step 1178, the short period restrarting indicative flag $F_S$ is reset at a step 1190. Thereafter, the end timer value $T_E$ is compared with a second end timer threshold $T_{ES2}$ which represents longer period than the first end timer threshold $T_{ES1}$ and defines a period for operating the pressure holding mechanism 17 at the pressure holding position. When the end timer value $T_E$ is smaller than the second end timer threshold $T_{ES2}$ as checked at the step 1192, process goes back to the step 1176. On the other hand, when the end timer value $T_E$ is greater than the second end timer threshold $T_{ES2}$ as checked at the step 1192, the end timer value $T_E$ is cleared at a step 1194 and the self-holding signal $S_S$ is switched into LOW level at a step 1196. Thereafter, process goes END.

Also, ON-set transition can be controlled by monitoring line pressure. For this, the active suspension system includes a pressure holding mechanism with a pressure holding valve means which is maintained in conductive state for a given period in which the fluid pressure in a working chamber is gradually adjusted toward a predetermined neutral pressure level after turning OFF of a power switch. The pressure holding valve is, on the other hand, maintained in non-conductive state for a given period until the fluid pressure is adjusted to the neutral pressure after turning ON of the power switch. A control means is provided for performing suspension control operation in response to various suspension control parameters for adjusting fluid pressure in a working chamber of a cylinder for regulating vehicular height and vehicular attitude. The control means being responsive to switching of the pressure holding valve from non-conductive state to conductive state for permitting pressure supply therethrough for maintaining a suspension control command value at a predetermined value essentially corresponding to a neutral pressure for a predetermined transition period so as to assure moderate increase of the fluid pressure.

Figure 7:
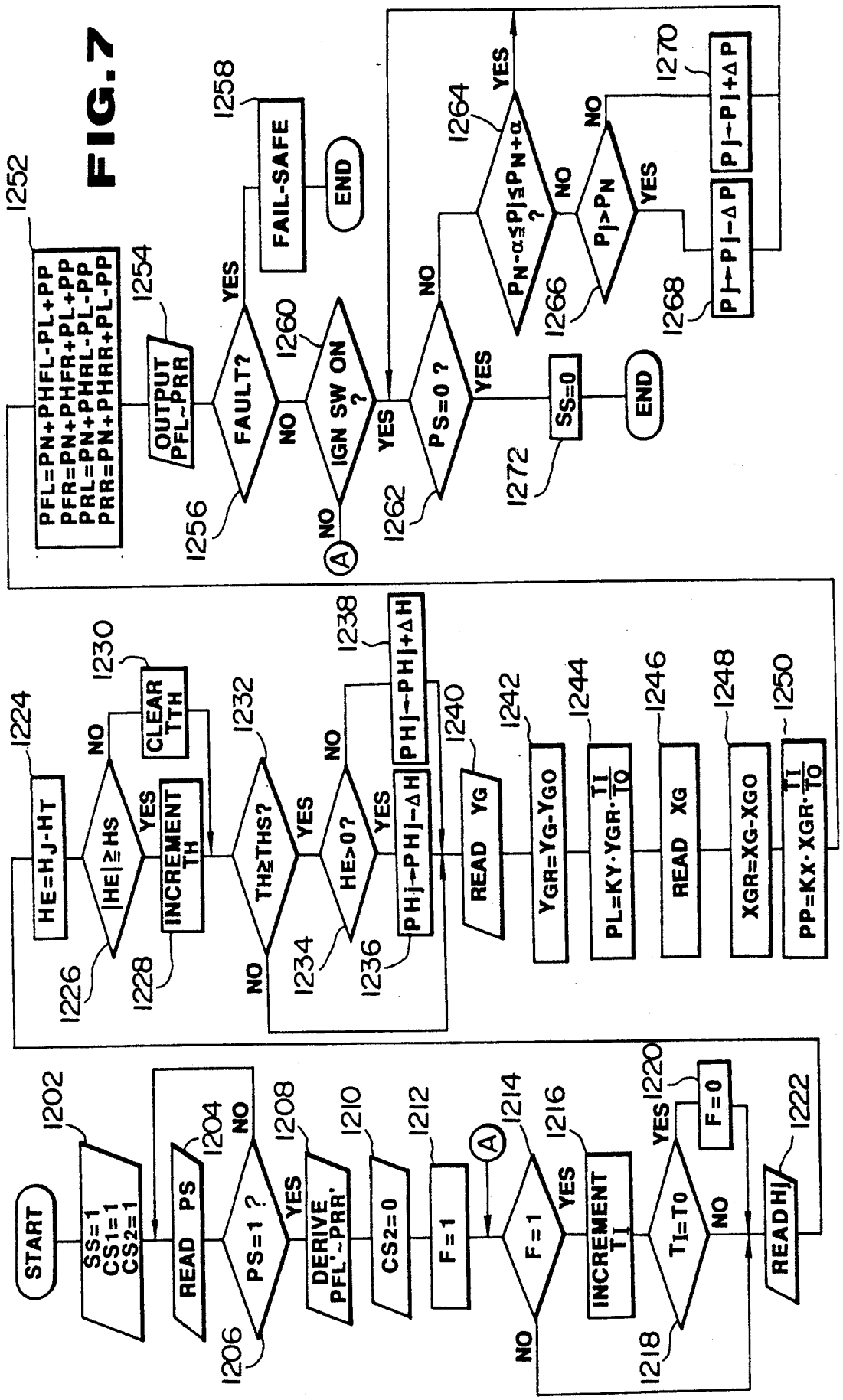
FIG. 7 is a flowchart showing a further rolling control routine for deriving the suspension control command, for which the shown embodiment of fail-safe system is applicable.

FIG. 7 shows a routine to be executed by the microprocessor 110 in the control unit 100 of the shown embodiment of the active suspension system. As can be appreciated, the shown routine may be programmed as one of interrupt routines to be executed by interrupting a main program which governs a plurality of routines. Therefore, the shown routine may be executed periodically at a given interval.

Initially, the shown routine is triggered in response to turning ON of the ignition switch 140. Namely, upon ON-set of the ignition switch 140, the transistor $Q_1$ of the power circuit 132 is turned ON. In response to this, the ignition relay 136 is turned ON. Therefore, power supply for the control unit 100 is initiated.

Immediately after starting execution, the fail-safe signal $CS_1$, the flow control signal $CS_2$ and the self-holding signal $S_S$ are respectively switched into HIGH level at a step 1202. By this, the fail-safe valve 18 is placed at open position for permitting fluid flow through the supply line 35 and the drain line 37. On the other hand, the flow control valve 171 is responsive to the HIGH level flow control signal $CS_2$ to be placed at the flow blocking position. Therefore, the pressurized fluid flows only through the flow restriction orifice 171b for supplying limited flow rate of the working fluid for the pressure control valves 28FL, 28FR, 28RL and 28RR. Then, at a step 1204, the pressure level indicative signal PS is read out. The pressure level indicative signal level PS is then checked whether is is HIGH level, at a step 1206. The steps 1204 and 1206 are repeated until the pressure level indicative signal level PS is turned into HIGH level. Namely, since the pressure level indicative signal PS is switched into HIGH level in response to opening of the operational one-way check valve 172, the process at the steps 1204 and 1206 are repeated until the operational one-way check valve is placed at the conductive state to permit fluid flow therethrough. In other words, since the operational one-way check valve 172 is set the set pressure substantially corresponding to the neutral pressure $P_N$, the pressure level indicative signal PS represents the line pressure in the supply line which is supplied to the operational one-way check valve as the pilot pressure $P_P$, reaches the neutral pressure.

Subsequently, the suspension control commands $P_{FL}$, $P_{FR}$, $P_{RL}$ and $P_{RR}$ are set at an initial values $P_{FL}'$, $P_{FR}'$, $P_{RL}'$ and $P_{RR}'$ at a step 1208.

Here, in general, the suspension control command values $P_{FL}$, $P_{FR}$, $P_{RL}$ and $P_{RR}$ are derived on the basis of the neutral pressure $P_N$, height control value $PH_{FL}$, $PH_{FR}$, $PH_{RL}$ and $PH_{RR}$ which are derived on the basis of the difference between the target height $H_S$ and the height indicative data $H_{FL}$, $H_{FR}$, $H_{RL}$ and $H_{RR}$, the anti-rolling control value $P_{YG}$, the anti-pitching control value $P_{XG}$, and off-set command value $PO_{FL}$, $PO_{FR}$, $PO_{RL}$ and $PO_{RR}$ which represents required off-set pressure from the neutral pressure $P_N$ set for compensating lag time of pressure adjustment. The manner of derivation of the suspension control commands $P_{FL}$, $P_{FR}$, $P_{RL}$ and $P_{RR}$ can be expressed by the following equations:

$$P_{FL} = P_N + PH_{FL} - P_{YG} + P_{XG} + PO_{FL} \quad (1)$$

$$P_{FR} = P_N + PH_{FR} - P_{YG} + P_{XG} + PO_{FR} \quad (2)$$

$$P_{RL} = P_N + PH_{RL} - P_{YG} + P_{XG} + PO_{RL} \quad (3)$$

$$P_{RR} = P_N + PH_{RR} - P_{YG} + P_{XG} + PO_{RR} \quad (4)$$

Here, at the initial stage upon ON-set of the ignition switch 140, the height control values $PH_{FL}$, $PH_{FR}$, $PH_{RL}$ and $PH_{RR}$, the anti-rolling control value $P_{YG}$ and the anti-pitching control value $P_{XG}$ are maintained zero (0). Therefore, assuming the initial off-set value $PO_{FL}$, $PO_{FR}$, $PO_{RL}$ and $PO_{RR}$ are respectively $P_I$, the foregoing equation can be modified for deriving the initial suspension control command values $P_{FL}'$, $P_{FR}'$, $P_{RL}'$ and $P_{RR}'$ $$P_{FL} = P_N + P_I \quad (5)$$

$$P_{FR} = P_N + P_I \quad (6)$$

$$P_{RL} = P_N + P_I \quad (7)$$

$$P_{RR} = P_N + P_I \quad (8)$$

Therefore, at the step 1208, the suspension control command values $P_{FL}'$, $P_{FR}'$, $P_{RL}'$ and $P_{RR}'$ are derived by the foregoing equations (5) to (8). Thereafter, at a step 1210, the flow control signal $CS_2$ is switched into LOW level to place the flow control valve 171 at the open position. Then, an initial stage indicative flag F is set at a step 1212. At a step 1214, the initial stage indicative flag F is checked whether it is set or not. When the initial stage indicative flag F is set as checked at the step 1214, then an initial period timer value $I_T$ incremented at a step 1216. The initial period timer value $I_T$ is compared with a predetermined set initial period value $T_0$ which represents an ON-set period for maintaining the pressure holding mechanism 17 at the pressure holding position after switching of the ignition switch 140 into ON position, at a step 1218. In practice, the ON-set period is set at several seconds in the preferred embodiment. When the initial period timer value $I_T$ is smaller than the set initial period value $T_0$, the process goes to a step 1222 to read the the height indicative data $H_{FL}$, $H_{FR}$, $H_{RL}$ and $H_{RR}$ which will be generally represented by $H_j$. On the other hand, when the initial period timer value $I_T$ is greater than or equal to the set initial period value $T_0$, the initial period indicative flag F is reset at a step 1220. Then process goes to the step 1222 set forth above.

At a step 1224, the height indicative data $H_j$ as read at the step 1222 are compared with a target height representative value $T_H$ which represents a predetermined target height $H_S$. Thereafter, at the step 1224, difference values $H_E$ between the instantaneous height as represented by height indicative data $H_{FL}$, $H_{FR}$, $H_{RL}$ and $H_{RR}$ and the target height $H_S$ as represented by the target height representative value $T_H$ can be derived. Thereafter, the absolute value of the height difference $|H_E1|$ is compared the target height range indicative value $H_S$, at a step 1226. When the absolute value $|H_E|$ of the height difference is greater than the target height range indicative value $H_S$, a height adjustment timer $T_H$ is incremented by one at a step 1228. On the other hand, when the absolute value $|H_E|$ of the height difference is smaller than or equal to the target height value $H_S$, the height adjustment timer value $T_H$ is cleared at a step 1230.

Then, at a step 1232, the height adjustment timer value $T_H$ is compared with the height adjustment threshold value $T_{TH}$. If the height adjustment timer value $T_H$ as checked at the step 1232 is greater than or equal to the height adjustment threshold value $T_{TH}$, then, the height difference $H_E$ is checked whether it is zero (0) or not at a step 1234. Thereafter, at a step 1236, the height control command value $PH_{FL}$, $PH_{FR}$, $PH_{RL}$ and $PH_{RR}$ which will be generally represented by $PH_j$, are derived by subtracting the height variation indicative value $\Delta H$ from the previously derived height control command value derived in the immediately preceding execution cycle. Otherwise, at a step 1238, the height control command value $PH_j$, are derived by adding the height variation indicative value $\Delta H$ to the previously derived height control command value derived in the immediately preceding execution cycle.

When the height adjustment timer value $T_H$ is smaller than the height adjustment threshold value $T_{TH}$ as checked at the step 1232 or after the process at one of the steps 1236 and 1238, the lateral acceleration indicative data $Y_G$ which is derived from the lateral acceleration indicative signal $y_g$ by A/D conversion, is read out at a step 1240. Based on the lateral acceleration indicative data $Y_G$, a rolling magnitude indicative data $Y_{GR}$ is derived. Practically, the rolling magnitude indicative data $Y_{GR}$ is derived by subtracting a neutral position lateral acceleration value $Y_{G0}$ from the instantaneous lateral acceleration indicative data $Y_G$ at the position where the lateral acceleration on the vehicular body is zero (0) from the lateral acceleration indicative data $Y_G$, at a step 1242. By this, the rolling magnitude indicative data $Y_{GR}$ represents both of the vehicular rolling magnitude and the vehicular rolling direction. Thereafter, by multiplying the rolling magnitude indicative data $Y_G$ with a control coefficient $K_Y$ and $(I_T/T_0)$, anti-rolling control command value $P_L$ is derived at a step 1244. The longitudinal acceleration indicative data $X_G$ which is derived from the longitudinal acceleration indicative signal $x_g$ by A/D conversion, is read out at a step 1246. Based on the longitudinal acceleration indicative data $X_G$, a pitching magnitude indicative data $X_{GR}$ is derived. Practically, the pitching magnitude indicative data $X_{GR}$ is derived by subtracting a neutral position longitudinal acceleration value $X_{G0}$ at the position where the longitudinal acceleration on the vehicular body is zero (0) from the longitudinal acceleration indicative data $X_G$, at a step 1248. By this, the pitching magnitude indicative data $X_{GR}$ represents both of the vehicular pitching magnitude and the vehicular pitching direction. Thereafter, by multiplying the pitching magnitude indicative data $X_{GR}$ with a control coefficient $K_X$ and $(I_T/T_0)$, anti-pitching control command value $P_P$ is derived at a step 1250.

After the process at the step 1250, the suspension control command values $P_{FL}$, $P_{FR}$, $P_{RL}$ and $P_{RR}$ are derived at a step 1252. The suspension control command $P_{FL}$, $P_{FR}$, $P_{RL}$ and $P_{RR}$ with the control valve thus derived are output at a step 1254.

At a step 1256, the abnormality indicative signals from the fail detector 130 and the watch dog timer 142 are checked. If abnormality is detected at the step 1256, the fail-safe signal $CS_1$ is set at LOW level at the step 1258. At the same time, a self-holding signal $S_S$ for maintaining power supply for a predetermined OFF-set period after turning OFF of the ignition switch 140, is switched into LOW level at the step 1258. Then, process goes END.

On the other hand, when the abnormality cannot be detected as checked at the step 1256, the position of the ignition switch 140 is checked at a step 1260. If OFF state of the ignition switch 140 is detected at the step 1260, then process returns to the step 1214. On the other hand, if the ignition switch 140 is in ON position, the level of the pressure level indicative signal PS is checked at a step 1262. When the pressure level indicative signal PS as checked at the step 1262 is LOW level, the suspension control command value $P_j$ is checked whether it is within a predetermined range $\pm \alpha$ of a predetermined set pressure $P_K$ at a step 1264. When the suspension control command $P_j$ is not within the predetermined range $(P_K - \alpha \leq P_j \leq P_K + \alpha)$, then check is performed whether the suspension control command value $P_j$ is greater than the set pressure $P_N$ at a step 1266. When the suspension control command $P_j$ is greater than the neutral pressure $P_N$, then, the suspension control command value $P_j$ is derived by subtracting a predetermined value $\Delta P$ from the preceding value of the suspension control command derived in the immediately preceding cycle, at a step 1268. On the other hand, when the suspension control command value $P_j$ is smaller than the neutral pressure $P_N$ as checked at the step 1266, then the suspension control command value $P_j$ is derived by adding the predetermined value $\Delta P$ at a step 1270. After the process at one of the steps 1268 and 1270, or when the suspension control command is set within the predetermined range $(P_N - \alpha \leq P_j \leq P_N + \alpha)$, process returns to the step 1262. Therefore, the process at the steps 262 to 1270 are repeated until the pressure level indicative signal level PS becomes LOW level. On the other hand, when the pressure indicative signal level PS turns into LOW level, the self-holding signal $S_S$ is switched into LOW level at a step 1272. Thereafter, process goes END.

When the vehicle stops at a flat road with maintaining the ignition switch 140 at OFF position for period longer than the second end timer threshold $T_{ES2}$, the pressure source unit 16 is maintained inoperative position because of stopping of the engine. Therefore, the line pressure in the supply line 35 supplied from the pressure source unit 16 is maintained zero. At this condition, due to the line pressure in the supply line lower than or equal to the neutral pressure, the operational one-way check valve 172 is maintained at shut-off state. At this time, the pressure level indicative signal PS is maintained at LOW level since the operational one-way check valve 172 stays at closed position for blocking fluid flow therethrough and thus the fluid pressure in the drain line 37 is maintained at higher level than the set pressure $P_{set}$ of the pressure sensor.

What is claimed is:

1. An active suspension system comprising:
   a suspension system disposed between a vehicular body and a road wheel for damping energy for causing relative displacement between the vehicular body and the road wheel, said suspension system including means for defining a variable pressure chamber;
   a fluid circuit for circulating pressurized fluid across said variable pressure chamber, said fluid circuit including a pressurized fluid source and a pressure control valve means for adjusting fluid pressure within said variable pressure chamber across a predetermined neutral pressure;

a sensor means for monitoring vehicular driving parameter affecting vehicular attitude for producing a sensor signal indicative thereof;

a power supply circuit for supplying an electric power to said fluid pressure source for driving the latter;

a detector means for monitoring state of fluid flow for detecting line pressure to be supplied to said pressure control valve higher than said neutral pressure to produce a detector signal indicative thereof;

a fail-safe valve means disposed in said fluid circuit for establishing closed circuit across said pressure control valve and said working chamber for maintaining fluid pressure in said closed circuit substantially at said neutral pressure, in response to a fail-safe command;

a fail detector means for detecting of failure of component of suspension control system to produce a fail detecting signal which is to be maintained while the faulty condition of the component of said suspension control system is maintained;

a vehicular driving condition detector for detecting a predetermined vehicle driving condition for producing a vehicular driving condition indicative signal;

a control means responsive to said sensor signal for deriving a suspension control command for controlling said pressure control valve for adjusting pressure in said variable pressure chamber for regulating vehicular height and vehicular attitude, said control unit being responsive to said fail detecting signal to produce said fail-safe command and responsive termination of said fail detecting signal for resuming normal active suspension control when and condition of absence of said fail detecting signal and presence of said vehicular driving condition indicative signal is established.

2. An active suspension system as set forth in claim 1, which further comprises a pressure holding valve disposed in said drain line of said fluid circuit, which pressure holding valve is responsive to a line pressure lower than said neutral pressure for blocking fluid flow through said drain line, and said fail-safe valve means including a flow restriction orifice disposed in said drain line upstream of said pressure holding valve for permitting limited flow rate of working fluid while said fail-safe valve is in active position in response to said fail-safe command for permitting adjustment of fluid pressure toward the neutral pressure.

3. An active suspension system as set forth in claim 1, wherein said vehicle driving condition detector detects the vehicular driving condition, in which vehicle is not running or is traveling in straight which may not cause vehicular attitude change.

4. An active suspension system as set forth in claim 1, wherein said vehicle driving condition detector detects the vehicular driving condition, in which vehicle is not running and the power supply circuit is switched from power shut down position to power supply position.

5. An active suspension system as set forth in claim 1, wherein said vehicle driving condition detector detects the vehicular driving condition, in which vehicle is not running and brake is applied.

6. An active suspension system as set forth in claim 1, wherein said vehicle driving condition detector detects the vehicular driving condition, in which vehicle is not running and all vehicular doors are closed.

7. An active suspension system as set forth in claim 1, which further comprises a flow control valve network disposed between said pressurized fluid source and said pressure control valve means in said fluid circuit for establishing and blocking fluid communication between said pressurized fluid source and said pressure control valve means, said flow control valve network further operating to blocking of fluid flow back to said pressurized fluid source from said pressure control valve when the line pressure supplied to said pressure control valve is lower than said neutral pressure, and said control means is powered by the electric power supplied by said power supply circuit, said control means being responsive to initiation of power supply for maintaining said flow control valve network at flow blocking position until the line pressure at said pressure control valve is increased across said neutral pressure and maintaining said suspension control command value at a predetermined value for a predetermined period after placing said flow control valve network at a state permitting fluid flow thereacross.

8. An active suspension system as set forth in claim 7, wherein said control means maintains said flow control valve network at said flow blocking position for a predetermined period after turning of power supply circuit from power shut down position to power supply position.

9. An active suspension system as set forth in claim 7, wherein said control unit is also designed to maintain operation until the line pressure at said pressure control valve is adjusted substantially at said neutral pressure after shutting down of power supply from said power supply circuit.

10. An active suspension system as set forth in claim 9, wherein said control means sets said predetermined value to be initially set as said suspension control command value at a value substantially corresponding to said neutral pressure.

11. An active suspension system comprising:

a suspension system disposed between a vehicular body and a road wheel for damping energy for causing relative displacement between the vehicular body and the road wheel, said suspension system including means for defining a variable pressure chamber;

a fluid circuit, including a supply line for supplying pressurized fluid and a drain line for driving pressurized fluid, for circulating pressurized fluid through said supply line and said drain line across said variable pressure chamber, said fluid circuit including a pressurized fluid source and a pressure control valve means for adjusting fluid pressure within said variable pressure chamber across a predetermined neutral pressure;

a first flow control means disposed in said drain line between said pressure control valve and said pressurized fluid source, said second flow control means being responsive to the magnitude of line pressure supplied to said pressure control valve for switching position between a third flow control mode for permitting fluid flow thereacross for flowing back the working fluid drained from said pressure control valve to said pressurized fluid source while said line pressure supplied to said pressure control valve is maintained at least said neutral pressure, and a fourth flow control mode for blocking fluid flow therethrough while said line pressure supplied to said pressure control valve is maintained below said neutral pressure;

a sensor means for monitoring vehicular driving parameter affecting vehicular attitude for producing a sensor signal indicative thereof;

a control means responsive to said sensor signal for deriving a suspension control command for controlling said pressure control valve for adjusting pressure in said variable pressure chamber for regulating vehicular height and vehicular attitude, a fail-safe valve means disposed in said fluid circuit for establishing closed circuit across said pressure control valve and said working chamber for maintaining fluid pressure in said closed circuit substantially at said neutral pressure, in response to a fail-safe command;

a fail detector means for detecting of failure of component of suspension control system to produce a fail detecting signal which is to be maintained while the faulty condition of the component of said suspension control system is maintained;

a vehicular driving condition detector for detecting a predetermined stable vehicle driving condition for producing a stable vehicular driving condition indicative signal;

a control means responsive to said sensor signal for deriving a suspension control command for controlling said pressure control valve for adjusting pressure in said variable pressure chamber for regulating vehicular height and vehicular attitude, said control unit being responsive to said fail detecting signal to produce said fail-safe command and responsive termination of said fail detecting signal for resuming normal active suspension control when and condition of absence of said fail detecting signal and presence of said stable vehicular driving condition indicative signal is established.

12. An active suspension system as set forth in claim 11, wherein said vehicle driving condition detector detects the vehicular driving condition, in which vehicle is not running or is traveling in straight which may not cause vehicular attitude change.

13. An active suspension system as set forth in claim 11, wherein said vehicle driving condition detector detects the vehicular driving condition, in which vehicle is not running and the power supply circuit is switched from power shut down position to power supply position.

14. An active suspension system as set forth in claim 11, wherein said vehicle driving condition detector detects the vehicular driving condition, in which vehicle is not running and brake is applied.

15. An active suspension system as set forth in claim 11, wherein said vehicle driving condition detector detects the vehicular driving condition, in which vehicle is not running and all vehicular doors are closed.

16. An active suspension system as set forth in claim 1, which further comprises a power supply circuit for supplying an electric power to said fluid pressure source for driving the latter so as to enable supply of pressurized fluid to said fluid circuit, and a second flow control means disposed in said supply line between said pressurized fluid source and said pressure control valve means in said fluid circuit, said flow control means being operable between a first flow control mode for supplying line pressure for said pressure control valve at a first maximum flow rate and a second flow control mode for supplying line pressure for said pressure control valve at a second limited flow rate which is smaller than said first maximum flow rate, and said control unit is powered by the electric power supplied by said power supply circuit, said control means being responsive to initiation of power supply for maintaining said flow control means at said second flow control mode until said detector signal is present and maintaining said suspension control command value at a predetermined value for a predetermined period after placing said flow control valve network at a state permitting fluid flow thereacross.

* * * * *